United States Patent
Shino

(10) Patent No.: US 11,375,072 B2
(45) Date of Patent: Jun. 28, 2022

(54) IMAGE PROCESSING APPARATUS, CONTROL METHOD OF THE SAME, AND STORAGE MEDIUM

(71) Applicant: CANON KABUSHIKI KAISHA, Tokyo (JP)

(72) Inventor: Ikuko Shino, Chiba (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 17/363,823

(22) Filed: Jun. 30, 2021

(65) Prior Publication Data

US 2022/0006912 A1    Jan. 6, 2022

(30) Foreign Application Priority Data

Jul. 6, 2020   (JP) .............................. JP2020-116487

(51) Int. Cl.
*H04N 1/00* (2006.01)

(52) U.S. Cl.
CPC ..... *H04N 1/00517* (2013.01); *H04N 1/00411* (2013.01); *H04N 1/00413* (2013.01); *H04N 1/00514* (2013.01); *H04N 2201/0094* (2013.01)

(58) Field of Classification Search
CPC .......... H04N 1/00517; H04N 1/00411; H04N 1/00413; H04N 1/00514; H04N 2201/0094
USPC ....................................................... 358/1.15
See application file for complete search history.

(56) References Cited

U.S. PATENT DOCUMENTS 9,654,656 B2 * 5/2017 Akuzawa ........... H04N 1/00413
2011/0051165 A1 * 3/2011 Yamada .............. H04N 1/00413
                                                               358/1.15

FOREIGN PATENT DOCUMENTS

JP           2014013572 A       1/2014

* cited by examiner

*Primary Examiner* — Neil R McLean
(74) *Attorney, Agent, or Firm* — Canon U.S.A., Inc. IP Division

(57) ABSTRACT

According to an image processing apparatus of one aspect of the present disclosure, when a calling button used for executing an app is selected, a setting button generated based on a change history of setting information is displayed. This allows a user to select a setting value in a short procedure without increasing the number of calling buttons to be displayed on a window.

11 Claims, 20 Drawing Sheets

FIG. 6
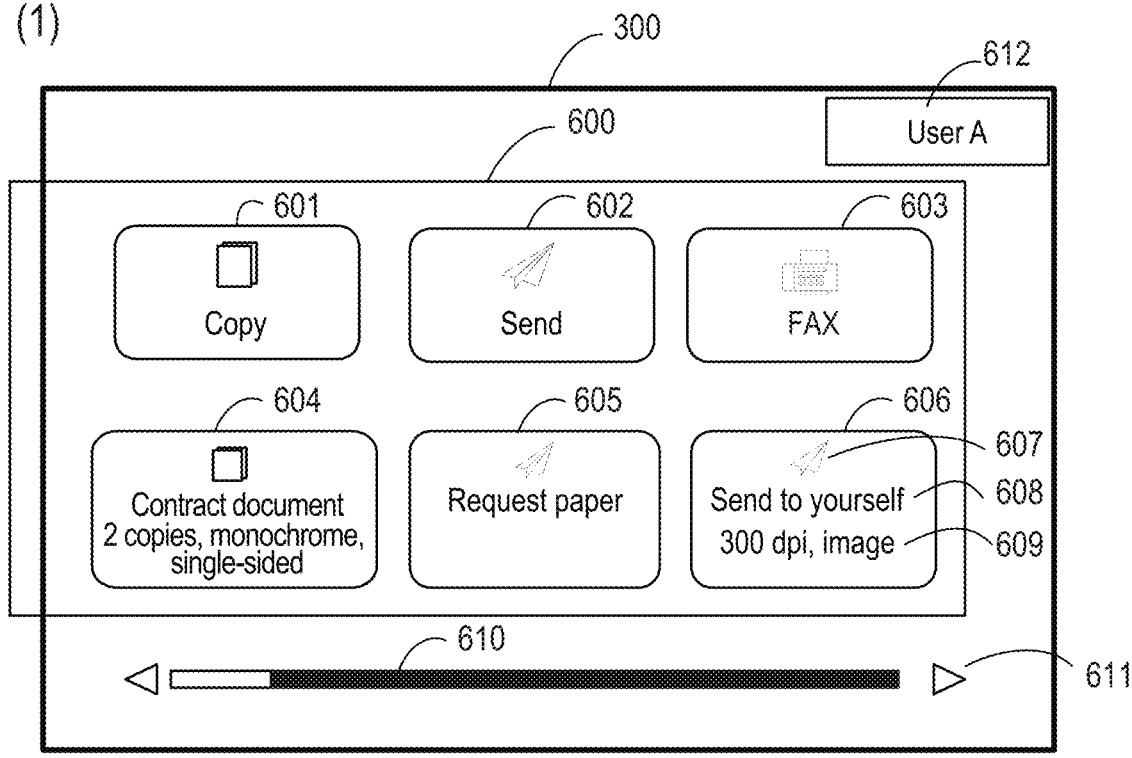
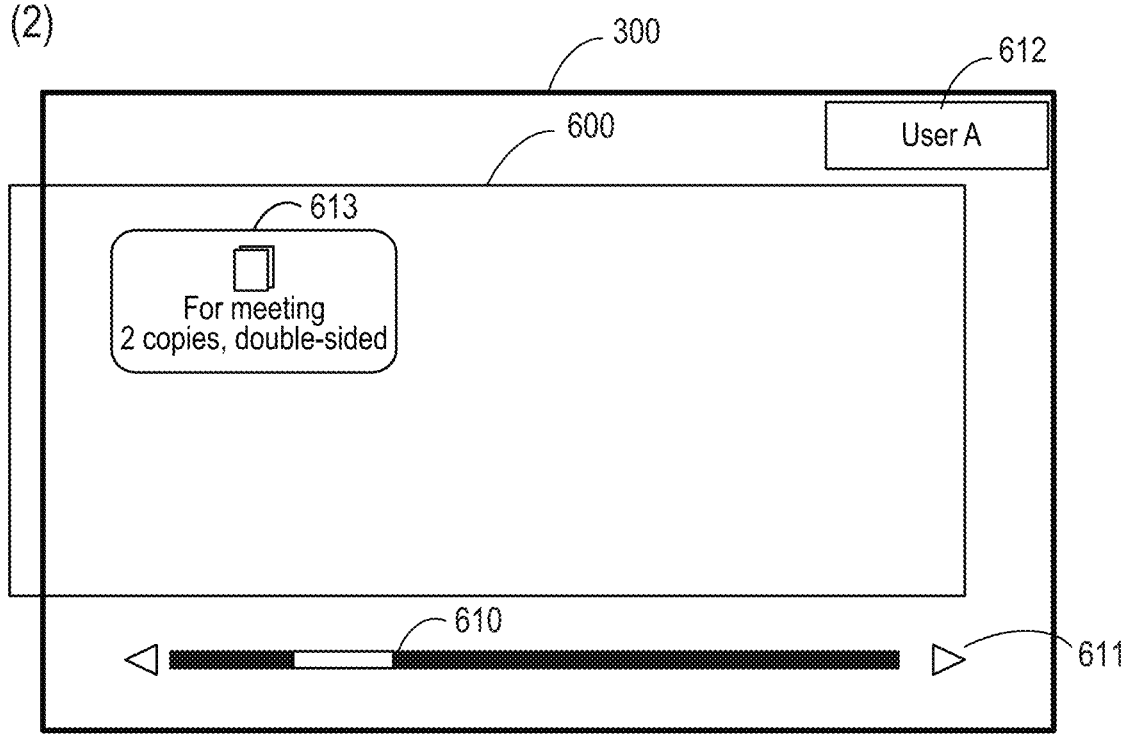

FIG. 7
(1)
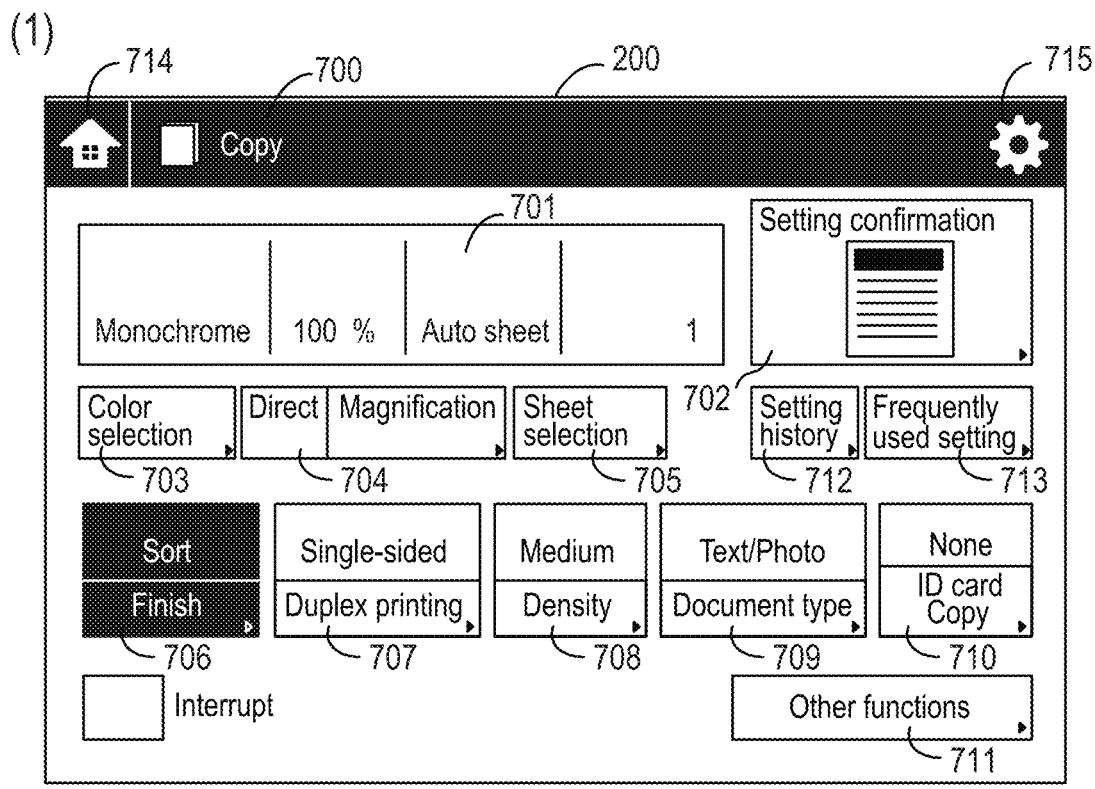
(2)
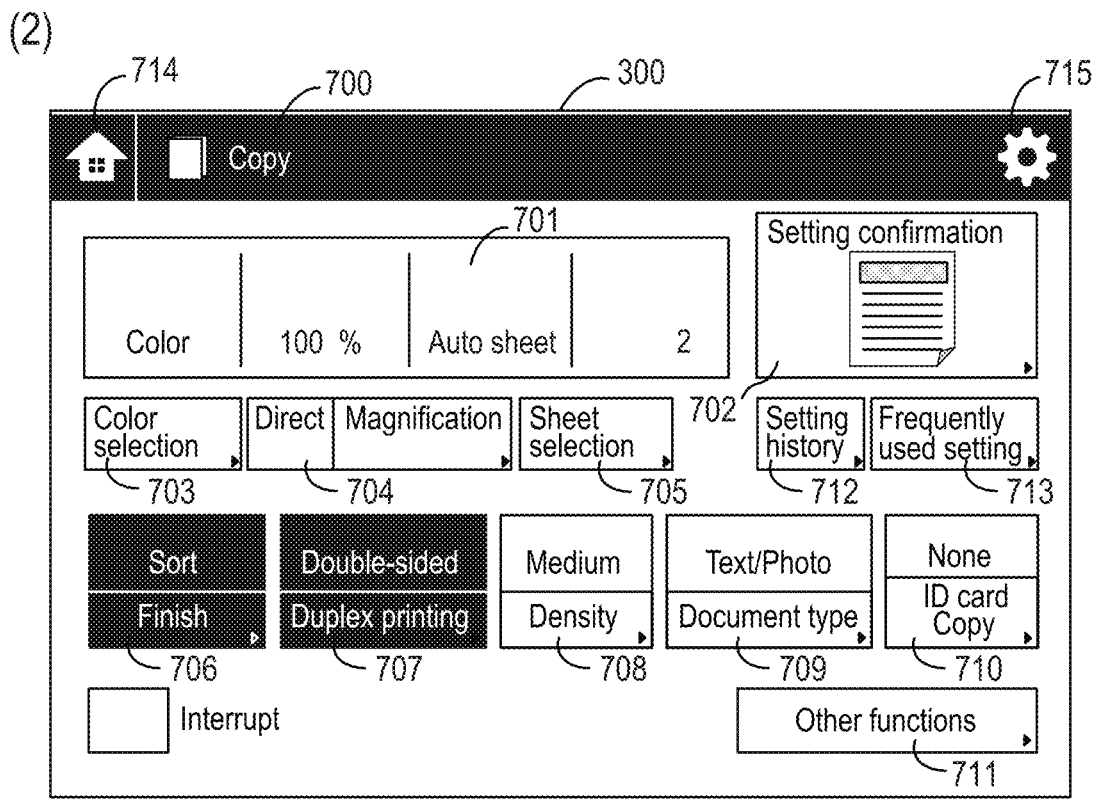

FIG. 9A
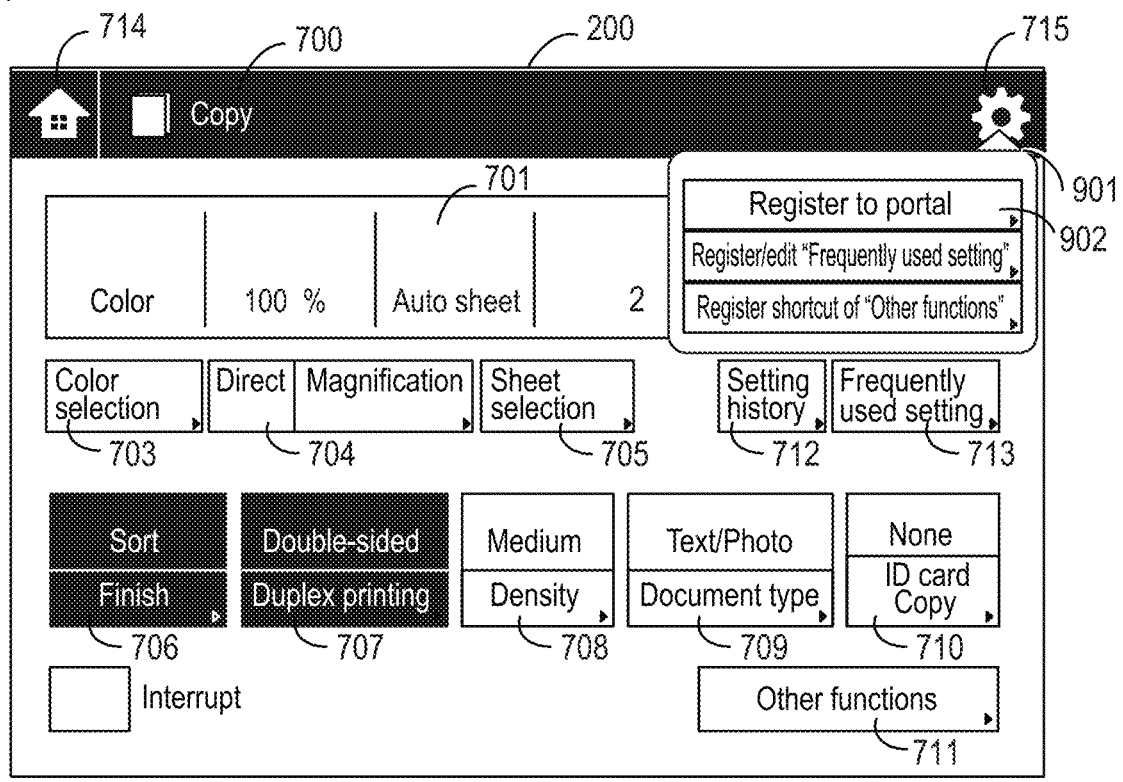
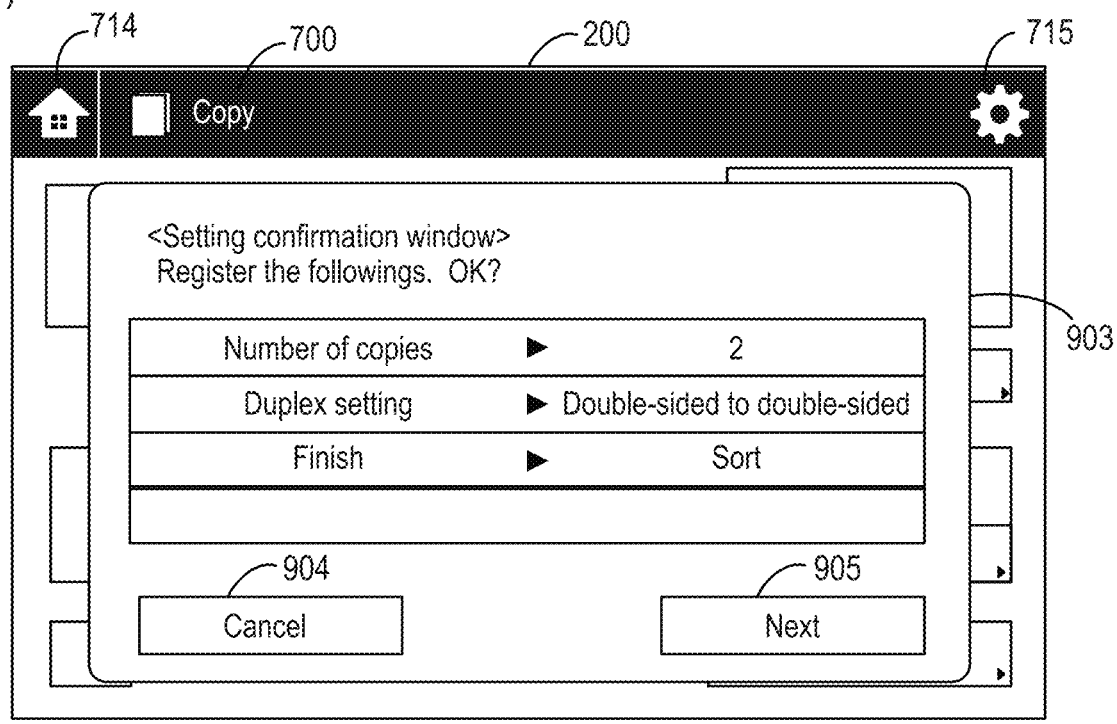

FIG. 9B
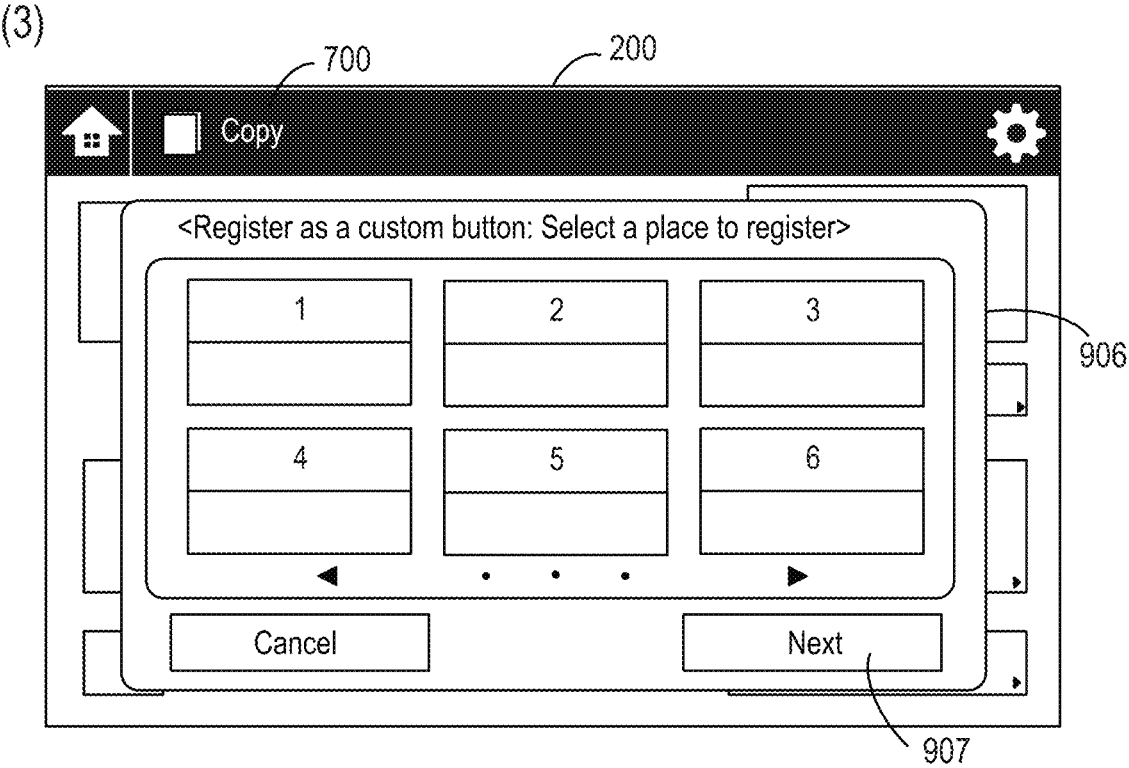
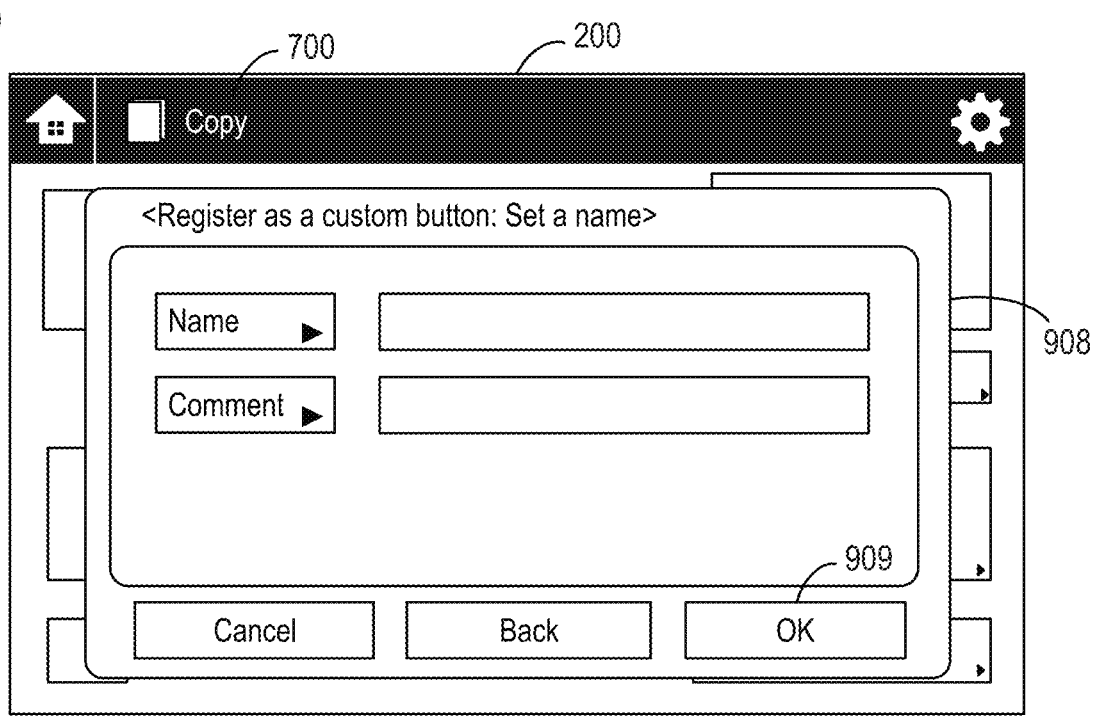

FIG. 11

| Action ID | Icon information | Setting information |
|---|---|---|
| 1 | copy.bmp | Copies: 2, Color: Monochrome |
| 2 | send.bmp | Copies: 2, Double-sided to double-sided, Finish: Sort |

| Action ID | Setting information difference | |
|---|---|---|
| | Setting value | Number of times of setting |
| 1 | Double-sided | 5 |
| | Staple top-right | 7 |
| 2 | Monochrome | 1 |
| | Single-sided | 1 |

(2)

| Action ID | Setting information difference | |
|---|---|---|
| | Setting value | Number of times of setting |
| 1 | Double-sided | 5 |
| | Staple top-right | 8 |
| | Color | 1 |
| 2 | Monochrome | 1 |
| | Single-sided | 1 |

(3)

| Action ID | Setting information difference | |
|---|---|---|
| | Combination of setting values | Number of times of setting |
| 1 | Double-sided, Staple top-right | 5 |
| | Color, 2 in 1 | 2 |
| 2 | Monochrome, Single-sided | 1 |

(4)

| Setting information difference | |
|---|---|
| Setting value | Number of times of setting |
| Monochrome | 2 |
| 4 copies | 3 |
| Double-sided | 4 |
| 2in1 | 3 |

(5)

| Action ID | Setting information difference | | Related setting information | | | |
|---|---|---|---|---|---|---|
| | Setting value | Number of times of setting | Setting value | Number of times of setting | Setting value | Number of times of setting |
| 1 | Double-sided | 5 | Monochrome | 3 | 3 copies | 2 |
| | Staple top-right | 7 | Sort | 7 | Text/Photo | 3 |
| | 2in1 | 3 | Full color | 3 | Staple top-right | 1 |

FIG. 15A
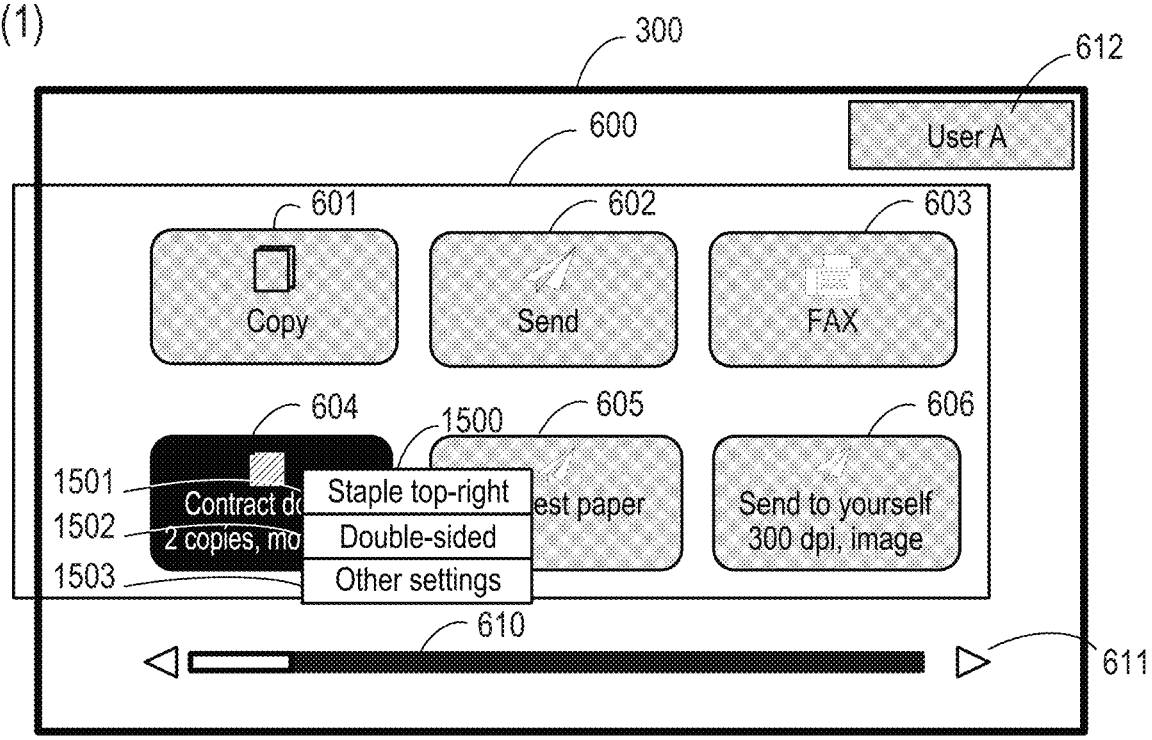
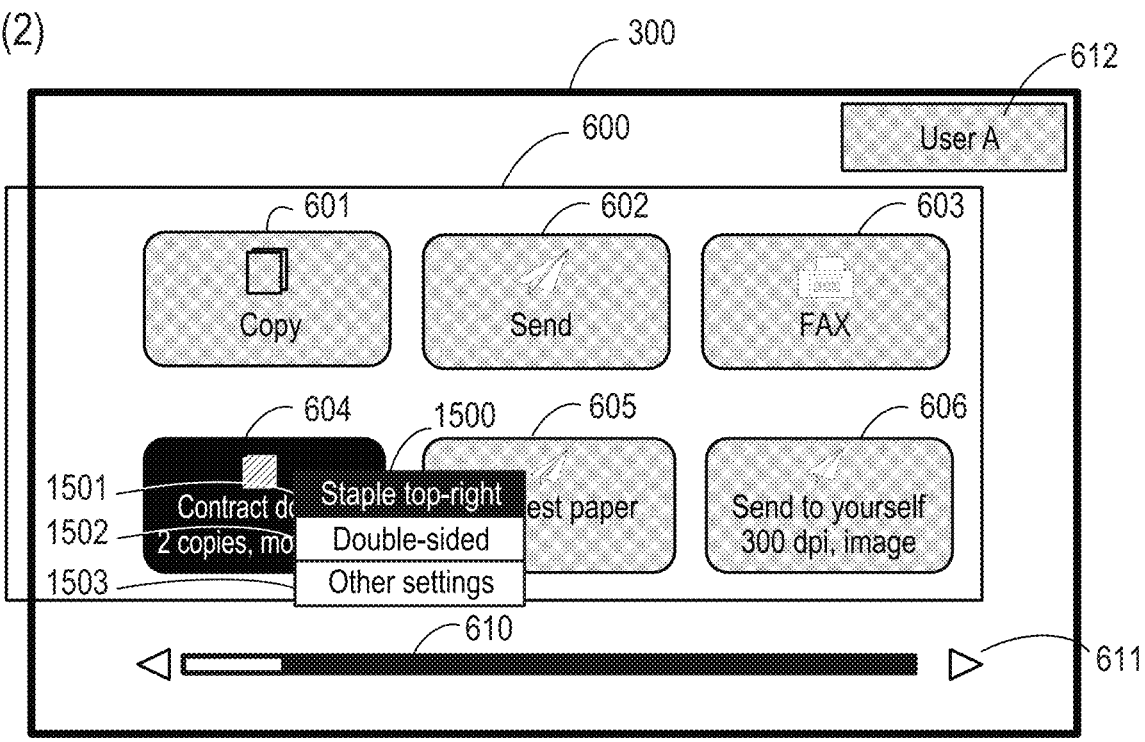

FIG. 15B
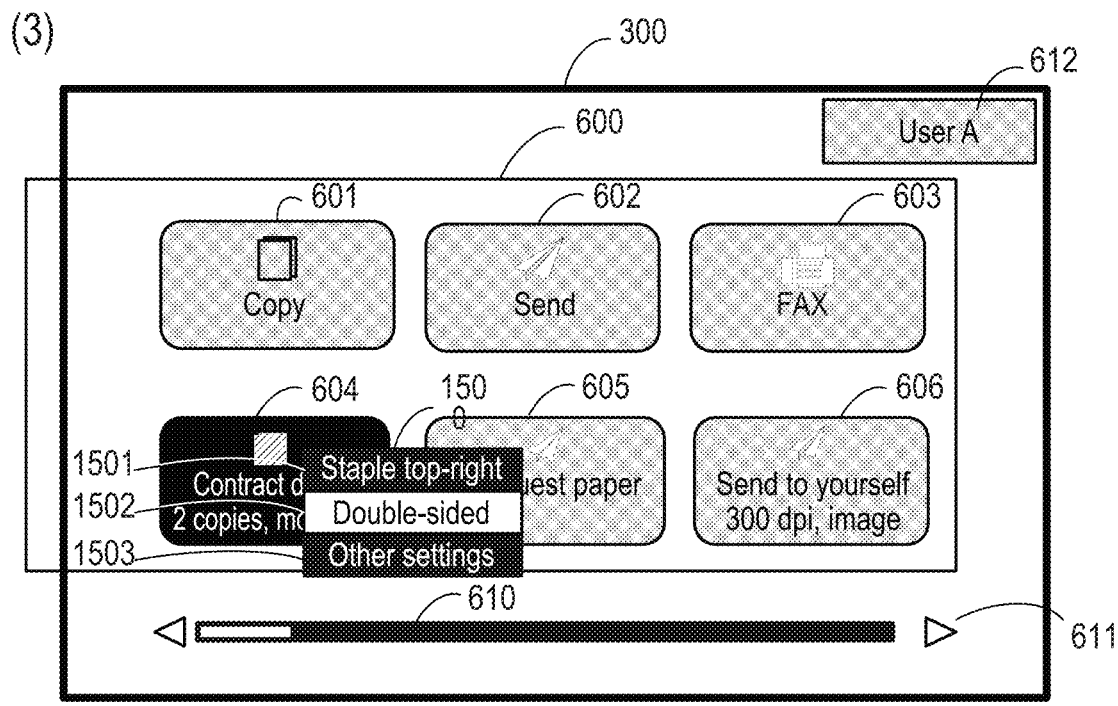
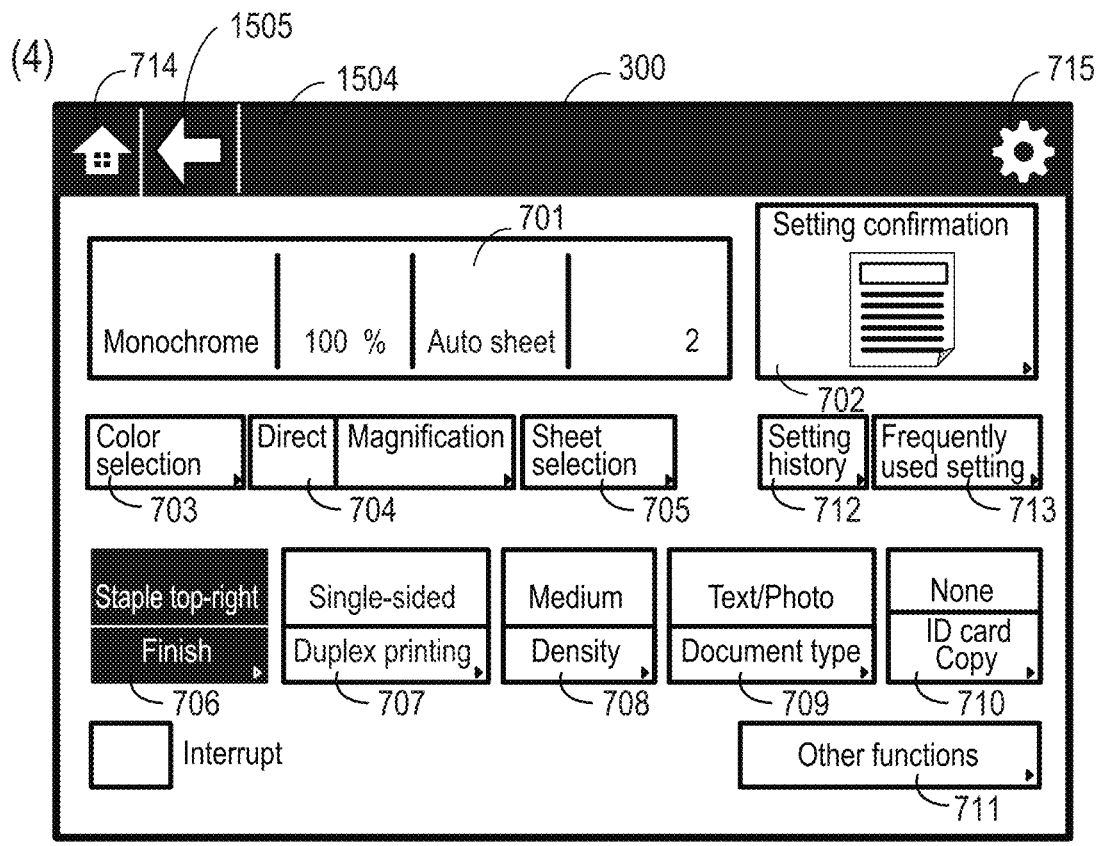

IMAGE PROCESSING APPARATUS, CONTROL METHOD OF THE SAME, AND STORAGE MEDIUM

BACKGROUND

Field

The present disclosure relates to an image processing apparatus, a control method, and a storage medium.

Description of the Related Art

In recent years, in image forming apparatuses such as a multi-function peripheral installed in an office or the like, functions have been increased and advanced, and a plurality of useful functions have been included. In general, in a multi-function peripheral, a plurality of installed applications (apps) such as copy or fax are selected from a portal window, and a setting window of apps is called. Then, in an app (for example, copy) setting window, a setting value (for example, one) about various setting items (for example, the number of copies) used for execution of the app is selected, and the app is executed.

However, a setting value to be set in execution of each app differs depending on users. Herein, for reducing procedures to repeat an app setting, a multi-function peripheral that provides a button and the like that call a setting value set for each user to the portal window is known (for example, Japanese Patent Application Laid-Open No. 2014-13572), As such a button, a button (custom button) to call a setting value preset for each user, a button (history button) to call a specific setting value used in the past, a button (operation specific button) to call a setting value specified to a specific operation, and the like are known.

For example, even when the same user executes an app, it is easily expected that a difference occurs in some setting values in accordance with purposes of use, for example, how many copies to print, whether the document is single-sided or double-sided, or the like. When a custom button and a history button are generated so as to meet a setting value for each purpose of use as described above, the number of required buttons becomes huge. Further, when the plurality of generated buttons are displayed on the portal window, some buttons are out of the portal window, and it takes much time for the user to find a desired button.

SUMMARY

Accordingly, embodiments of the present disclosure provide an image processing apparatus that makes it possible to select a setting value in a short procedure without increasing the number of buttons displayed on a window in accordance with a difference between some setting values for respective purposes of use.

An image processing apparatus according to embodiments of the present disclosure comprises: one or more processors and at least one memory coupled to the one or more processors and having instructions stored thereon, wherein when the instructions are executed by the one or more processors, the at least one memory and the one or more processors acting as: a display unit that displays a plurality of display objects used for accepting an execution instruction of a process performed by a predetermined function and associated with setting values different from each other, respectively; a processing unit that, when execution of the process is instructed by an operation of any one of the plurality of display objects, executes the process in accordance with a setting value associated with the operated display object; and a storage unit that, when some of the setting values associated with the display object in instruction for the process execution are changed and the process is executed based on the changed setting value, stores information indicating the changed setting value as history information for each of the display objects, wherein when any one of the plurality of display objects is operated, the display unit displays a setting value indicated by the history information stored in the storage unit as a change candidate of a setting value associated with the operated display object.

Further features of the present disclosure will become apparent from the following description of exemplary embodiments with reference to the attached drawings.

BRIEF DESCRIPTION OF THE DRAWINGS

FIG. 6 illustrates one example of a portal window.

FIG. 7 illustrates one example of a copy setting window.

FIG. 9A illustrates an example of a copy setting window.

FIG. 9B illustrates an example of a copy setting window.

FIG. 11 illustrates one example of an action information table.

FIG. 13 illustrates an example of a setting information difference table.

FIG. 15A illustrates an example of a list of setting change choices displayed on a copy setting window.

FIG. 15B illustrates an example of the list of setting change choices and a setting change window.

DESCRIPTION OF THE EMBODIMENTS

Embodiments related to the present disclosure will be described below with reference to the drawings. Note that the embodiments described below are only examples and do not intend to limit the scope of the present disclosure. Further, not all of combinations of features described in each embodiment below are necessarily essential to the solution in the present disclosure.

First Embodiment

1. Internal Configuration of Image Processing Apparatus

Figure 1:
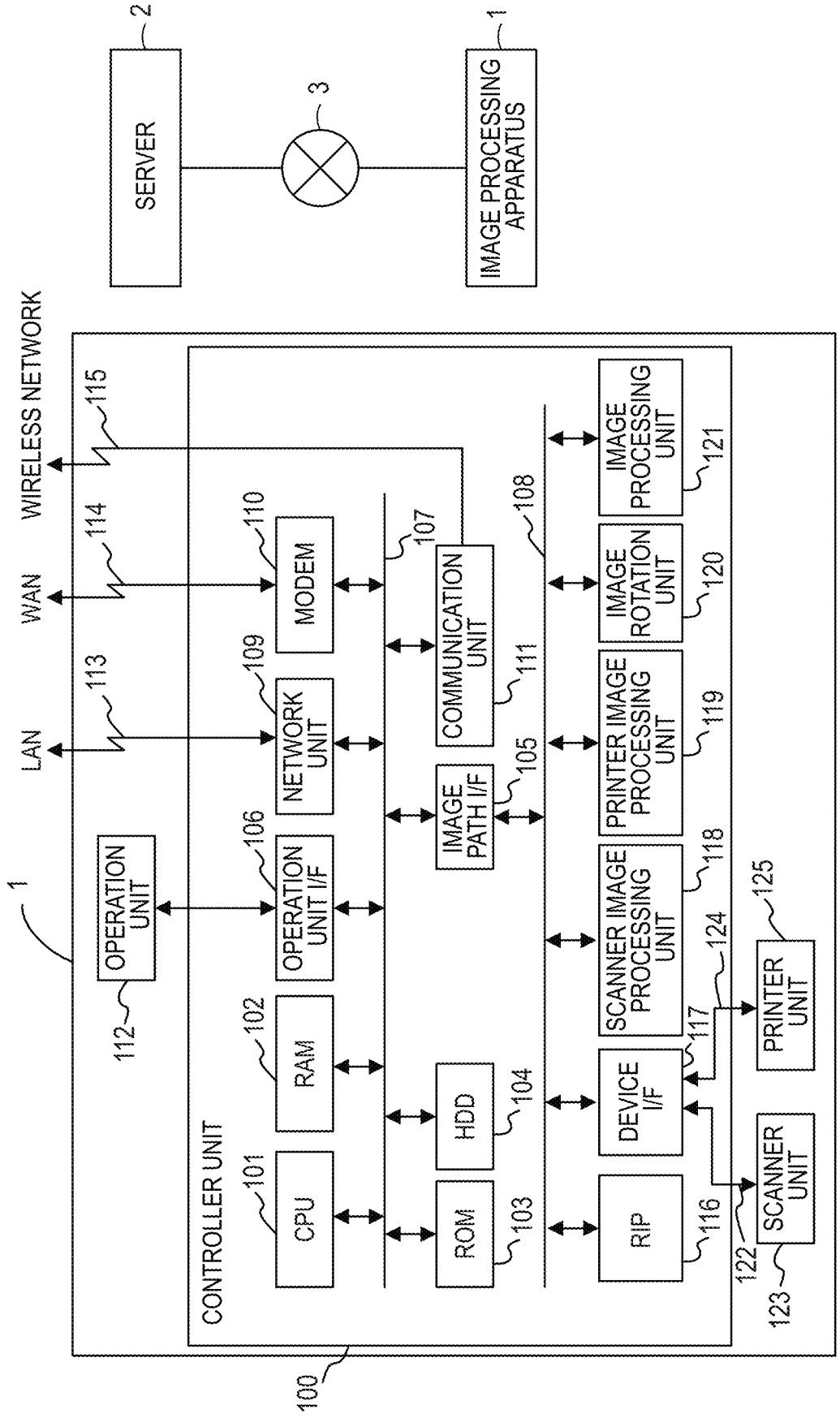
FIG. 1A is a block diagram illustrating one example of an internal configuration of an image processing apparatus according to the embodiment of the present disclosure.
FIG. 1B illustrates a system configuration example including the image processing apparatus.

FIG. 1A is a block diagram illustrating one example of an internal configuration of an image processing apparatus according to the embodiment of the present disclosure.

An image processing apparatus 1 is formed of an image forming apparatus such as a multi-function peripheral (MFP), for example. The image processing apparatus 1 includes a controller unit 100 that controls each unit in the image processing apparatus 1, an operation unit 112, a scanner unit 123, and a printer unit 125, for example, as a basic configuration.

The operation unit 112 is formed of number keys used for inputting a number, a hard key such as a start key used for performing a process or a liquid crystal touch panel, for example, and provides a user interface for a user to operate the image processing apparatus 1. The user is able to input information to the image processing apparatus 1 and perform setting by pressing the hard key of the operation unit 112 or touching an icon or a button indicating various setting items displayed on the touch panel.

The scanner unit 123 reads an image such as a document as image data. The printer unit 125 conveys a recording sheet and prints image data on the recording sheets as a visible image.

The controller unit 100 is connected to the scanner unit 123 via a bus 122 and further connected to the printer unit 125 via a bus 124. The controller unit 100 is further connected to other apparatuses via a LAN 113, a public network (WAN) 114, or a wireless network 115 and controls input/output of image information and device information.

Next, hardware components inside the controller unit 100 will be described. The CPU 101 is a controller that controls the overall system. The RAM 102 is a system work memory used for the CPU 101 to operate and an image memory used for temporarily storing image data. The ROM 103 is a boot ROM and stores a boot program of the system. The HDD 104 is a hard disk drive and stores system software, image data, and information related to all wireless communications (specification of wireless communications) of a communication unit 111 described below.

In the image processing apparatus 1, the number of functions can be increased by installing an application (hereinafter, referred to as "app") that implements a function intended to be used. An app is installed, and thereby an application program used for operating various functions on the image processing apparatus 1 is stored in the RAM 102 or the HDD 104.

An operation unit I/F 106 is an interface unit between the operation unit 112 that is a user interface (UI) and the controller unit 100 and outputs, to the operation unit 112, data to be displayed on the operation unit 112. The operation unit I/F 106 further has the role of transferring information input from the operation unit 112 by the user to the CPU 101.

A network unit 109 is connected to the LAN 113 and inputs/outputs information. A MODEM 110 is connected to the WAN 114 and inputs/outputs information. The communication unit 111 is connected to the wireless network 115 via an antenna (not illustrated) and inputs/outputs information. Further, the communication unit 111 can perform multiple types of wireless communication. The above hardware components are arranged on a system bus 107.

An image bus I/F 105 is a bus bridge that connects the system bus 107 to an image bus 108 that transfers image data at a high rate and converts data structure. The image bus 108 is defined by a PCI bus, IEEE1394, or the like.

Devices arranged on the image bus 108 will be described. A raster image processor (RIP) 116 rasterizes a PDL code into a bit map image. A device I/F 117 connects the scanner unit 123 or the printer unit 125 to the controller unit 100 and performs synchronous/asynchronous conversion of image data. A scanner image processing unit 118 performs correction, processing, edition, and the like on the input image data. A printer image processing unit 119 performs, on the print output image data, correction, resolution conversion, or the like suitable for the printer unit 125. An image rotation unit 120 rotates image data. An image processing unit 121 performs, on image data, a compression and expansion process such as JPEG, JBIG, MMR, or MH or a format conversion process such as PDF, TIFF, OCR, or encryption.

FIG. 1B illustrates a system configuration example including the image processing apparatus 1.

The image processing apparatus 1 is connected to a server 2, which is an external device, by a network 3 via the LAN 113, the WAN 114, the wireless network 115, or the like.

2. Software Configuration of Image Processing Apparatus

Next, a software configuration such as an app installed in the image processing apparatus 1 will be described with reference to FIG. 2.

As an app installed in the image processing apparatus 1, a copy app 211, a fax app 212, a portal app 213, or the like are used. The copy app 211 has a function related to a copying operation, and the fax app 212 has a function related to a fax operation of transmitting/receiving document data. Further, the portal app 213 has a function related to a portal. These apps are directly installed in the image processing apparatus 1 by the user but may be installed in the image processing apparatus 1 via the network unit 109, the communication unit 111, or the like. The installed app is stored in the RAM 102 or the HDD 104 as an application program.

Further, apps such as the copy app 211, the fax app 212, and the portal app 213 installed in the image processing apparatus of FIG. 1A operate independently by commands from the CPU 101. Accordingly, data used in each app is classified into groups on an app basis and is stored in the HDD 104. Note that data shared with apps is stored in a common data unit 220 set in the HDD 104 as common data.

Further, an app ID is allocated to each app installed in the image processing apparatus 1 as an identifier used for identifying each app. The app ID is stored in the common data unit 220 as common data. In the following description, an app ID of the copy app 211 is defined as "1000", an app ID of the fax app 212 is defined as "1001", and app ID of the portal app 213 is defined as "1002".

A window control unit 201 determines which app is displayed on the operation unit 112 for a plurality of apps installed in the image processing apparatus 1. Each app such as the copy app 211 installed in the image processing apparatus 1 acquires data such as a window resource or a setting value from the HDD 104 and displays the data in accordance with a command from the window control unit 201. For example, in response to receiving a display request of the copy app 211 (app ID "1000"), the window control unit 201 determines whether or not display can be performed by a function of the copy app 211 and, if the display can be performed, the window control unit 201 notifies the copy app 211 of a display instruction. Note that, when setting information or the like is present in display, the information is notified together with the display command. The copy app 211 that has received the display command acquires a window resource and a setting value from the copy data pit 221 set in the HDD 104 and performs display on the operation unit 112.

On the other hand, when data that is not present in the copy data unit 221 is displayed, the copy app 211 notifies the window control unit 201 of a data request. The window control unit 201 that has received the data request acquires the corresponding data from the common data unit 220 set in the HDD 104 and notifies the copy app 211 of the data. The copy app 211 then displays the data.

The fax app 212 can transmit/receive data related to fax to/from the fax data unit 222 set in the HDD 104. Similarly, the portal app 213 can transmit/receive data related to a portal to/from a portal data unit 223 set in the HDD 104.

Figure 2:
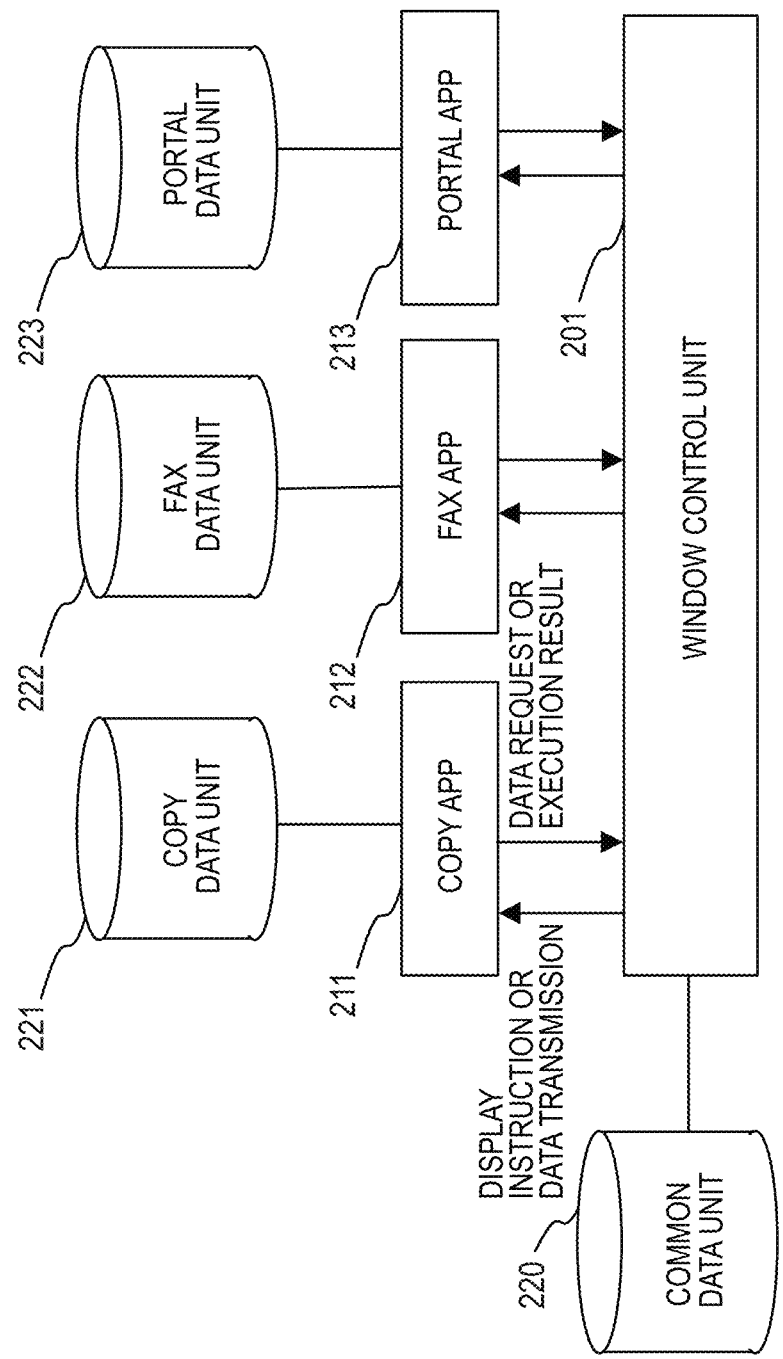
FIG. 2 illustrates a software configuration installed in the image processing apparatus.

Note that, while description is provided assuming that the image processing apparatus 1 has three types of apps of the copy app 211, the fax app 212, and the portal app 213 in FIG. 2, other apps can be included.

3. External Appearance of Operation Unit Including Touch Panel

Figure 3:
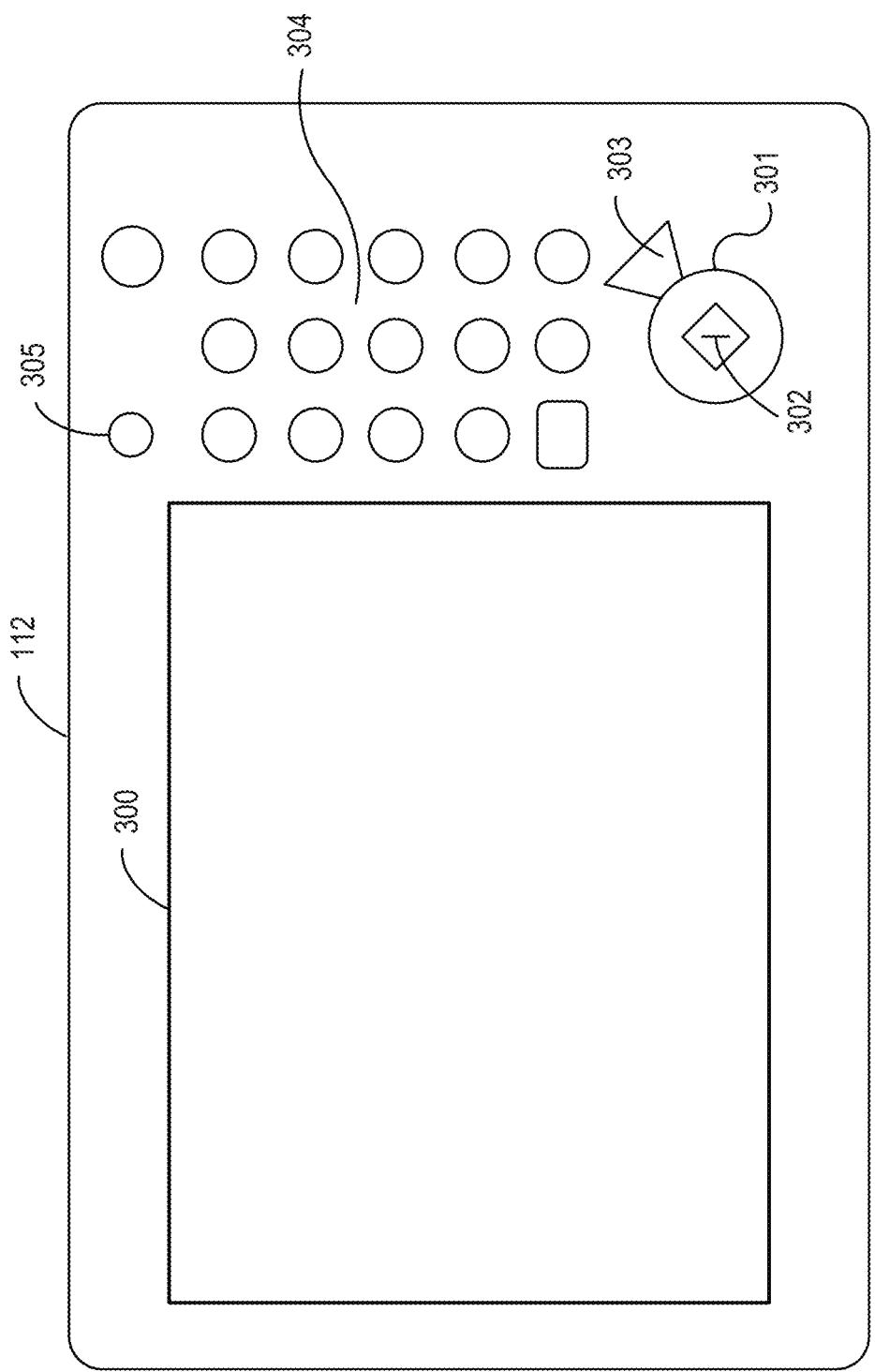
FIG. 3 is an external view of an operation unit.

FIG. 3 is an external view of the operation unit 112 included in the image processing apparatus 1.

The operation unit 112 is provided with a touch panel 300. The touch panel 300 is formed of a crystal liquid display unit, for example, and a touch panel sheet is attached on the crystal liquid display unit. An operation window and a soft key are displayed on the touch panel 300, and when the displayed soft key is touched, this position information is transmitted to the CPU 101.

Further, the operation unit 112 is provided with various keys and buttons operated by the user. A start key 301 is used in an instruction for starting a read operation of a document or the like. At the center portion of the start key 301, two colors of green and red LEDs 302 are provided, and the color indicates whether or not the start key 301 can be used. A stop key 303 is used when an active operation is stopped or the like. Number keys 304 are formed of number and character buttons and used for setting the number of copies, providing an instruction of switching a window of the touch panel 300, or the like. A user mode key 305 is pressed when an apparatus setting is performed.

Note that, in the following description, reference to "display a window" means that the CPU 101 calls corresponding window display data and a window control program from the HDD 104 or the RAM 102 and displays the window display data on the operation unit 112.

Similarly, reference to an operation performed on a touch panel or various keys such as "the user presses something" means that, when the user presses a button, a list, various keys, and the like displayed on the window, the CPU 101 acquires position information from the operation unit 112 and performs an instructed process based on the window control program.

In the present embodiment, all information (coordinates, fonts, image resources, default setting values, or the like) displayed on each window by each app is stored in any of the RAM 102, the ROM 103, and the HDD 104. Further, the information stored in the RAM 102, the ROM 103, the HDD 104, or the like is displayed on the touch panel 300 of the operation unit 112 via the operation unit I/F 106 by the control of the CPU 101.

4. User Authentication Process

Figure 4:
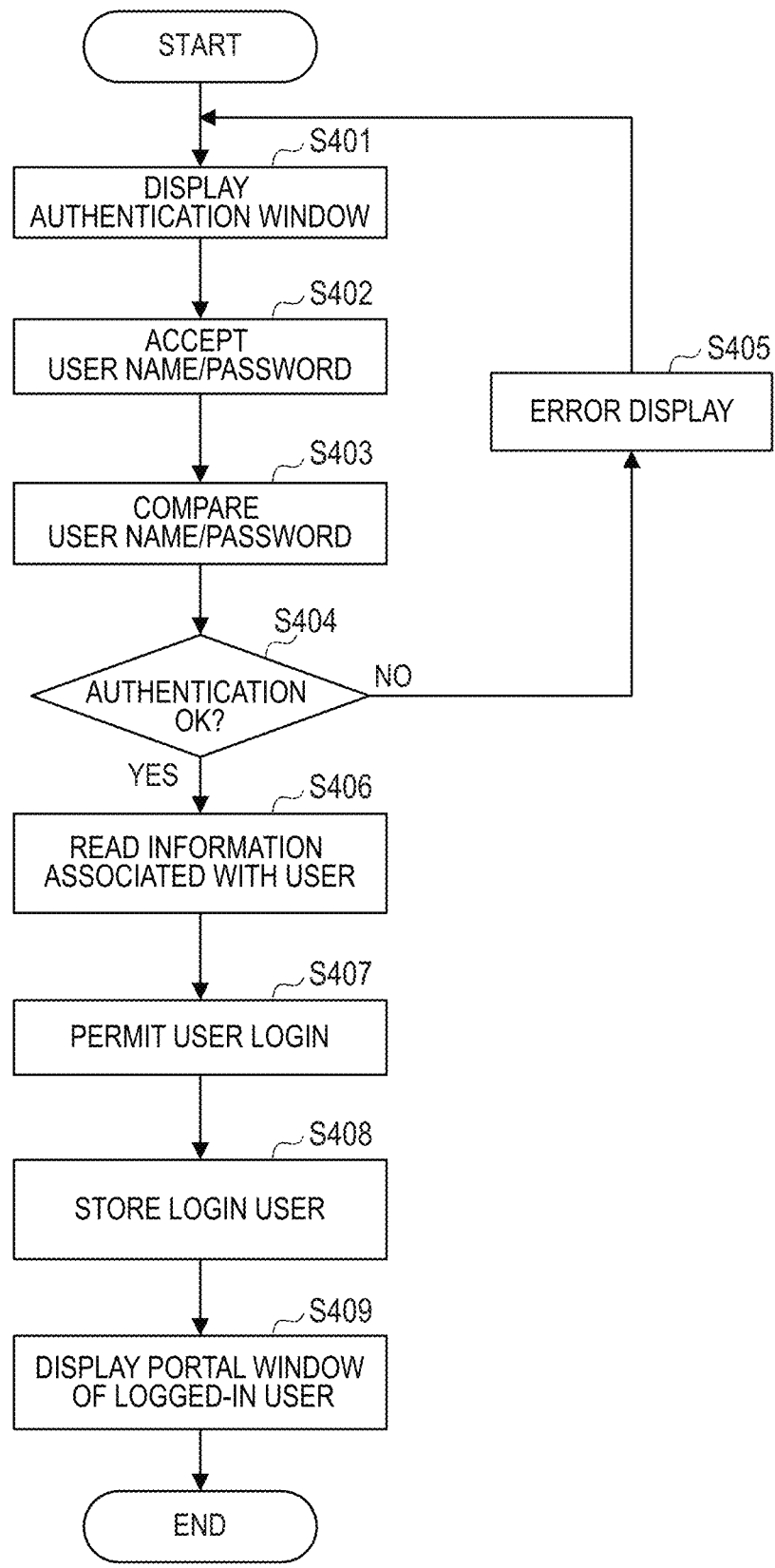
FIG. 4 is a flowchart illustrating a user authentication process.

FIG. 4 is a flowchart illustrating a user authentication process from starting up the image processing apparatus 1 to displaying a window of a logged-in user. The process in the flowchart illustrated in FIG. 4 is implemented when the CPU 101 executes a program stored in the HDD 104 or the like.

Figure 5:
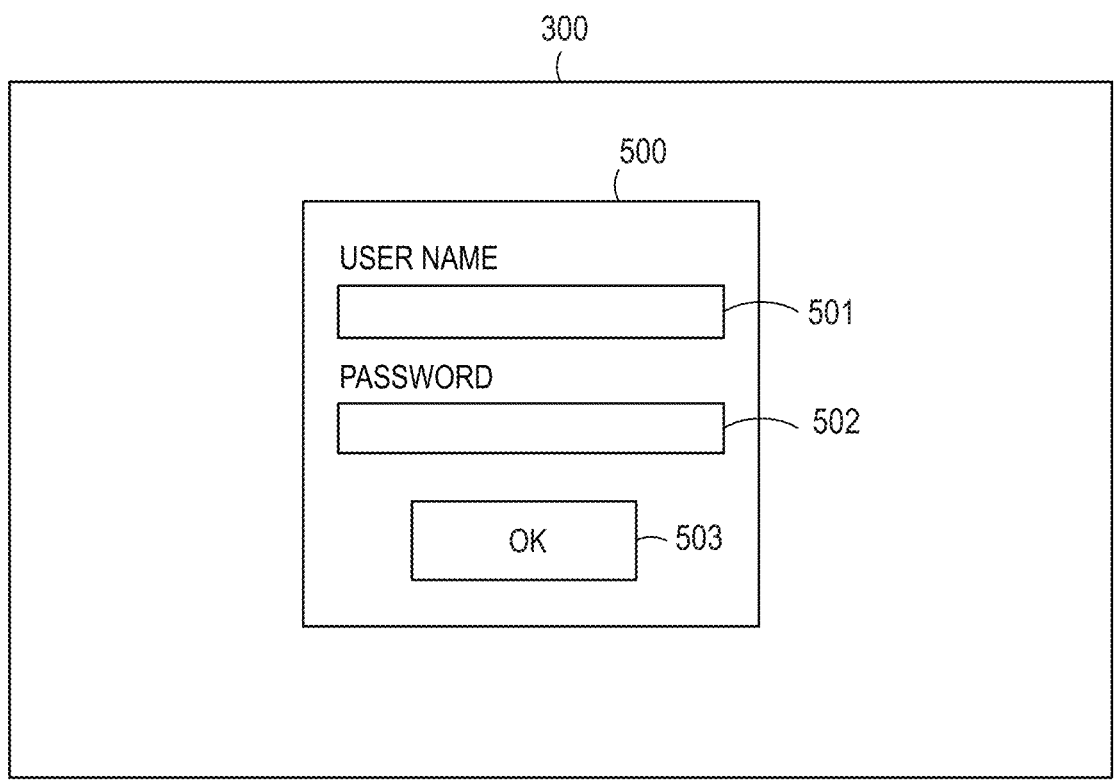
FIG. 5 illustrates one example of an authentication window.

First, if a setting used for identifying a user in the image processing apparatus 1 is ON, the CPU 101 displays an authentication window on the touch panel 300 after startup of the apparatus (S401), FIG. 5 illustrates one example of an authentication window 500 displayed on the touch panel 300. The authentication window 500 has a region used for inputting a user name 501 and a password 502.

After displaying the authentication window 500, the image processing apparatus 1 is in an input standby state for a user name and a password (S402).

When the user inputs a user name and a password registered in advance, respectively, and presses an OK button 503, the CPU 101 performs comparison as to whether or not the input user name and password match a user name and a password stored in the HDD 104 (S403).

If the user name and the password do not match (S404, NO), the CPU 101 displays an error message on the touch panel 300 and displays the authentication window 500 again (S405). On the other hand, if the user name and the password match (S404, YES), the CPU 101 calls information associated with the user stored in the HDD 104 (S406).

In response to completion of the calling, the CPU 101 permits the user to log in (S407) and stores the user permitted to log in in the HDD 104 as a logged-in user (S408). The CPU 101 then displays a portal window reflecting the called information on the logged-in user on the touch panel 300 (S409).

5. Portal Window

FIG. 6(1) illustrates one example of a portal window reflecting a setting of the logged-in user.

A menu 600 used for starting up various apps is displayed on the portal window of the logged-in user. Buttons such as app buttons 601 to 603, custom buttons 604 to 606, and the like are displayed on the portal window as a display object. Note that the app buttons 601 to 603 are calling buttons used for providing an instruction for app execution by using a default setting value, and the custom buttons 604 to 606 are calling buttons used for providing an instruction of app execution with a preset setting value. Note that such an object such as a button displayed on a window for providing an instruction for app execution is referred to as a display object. Further, for example, an icon 607, a button name 608, and a comment 609 to this button are displayed for the custom button 606, however, the displayed contents are not limited thereto.

Figures 9C, 10:
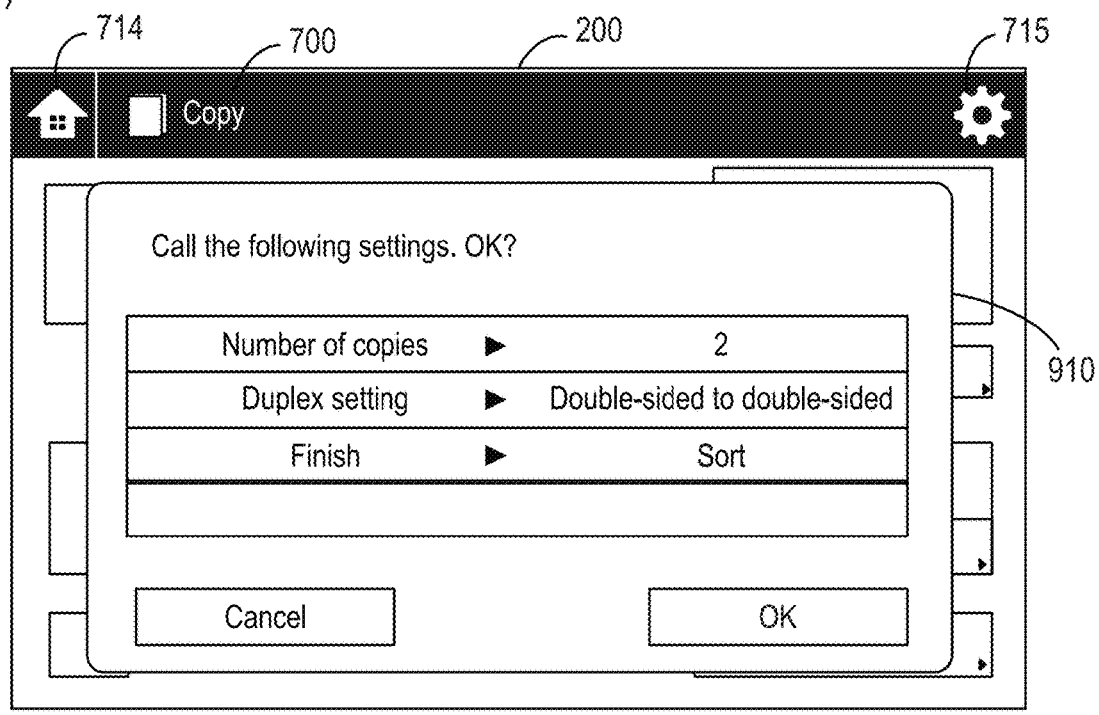
FIG. 9C illustrates an example of a copy setting window.
FIG. 10 illustrates one example of a button information table.

Information used for displaying the custom buttons 604 to 606 is managed in a button information table as illustrated in FIG. 10 and is stored in the HDD 104. The button information table illustrated in FIG. 10 is stored with an app ID, an action ID, icon information, display information, and user information being associated with a custom button No. allocated to the custom button.

The icon information includes image data in a bitmap format or the like displayed as an icon or a path to the image data. The display information includes a button name and a comment. The button name is a name of a button displayed on the icon. The comment is a content displayed on the icon as a comment. The user information includes a user name and a password. A custom button with the user information is displayed on the portal window of the logged-in user but is not displayed on the portal window of other users. On the other hand, a custom button without the user information is displayed not only on the portal window of the logged-in user but also on the portal window of all the users in a shared manner. Note that the action ID will be described later.

Returning to the description of FIG. 6(1), a slider bar 610 indicates that the menu 600 can be slidably moved. In response to sliding of the slider bar 610, pressing of an arrow 611, or flicking of a portion in the menu 600, the CPU 101 receives the input and calls and displays an app button or a custom button registered in the next region from the HDD 104. The current logged-in user name is displayed in a user name display region 612 at the upper right part. The example of FIG. 6(1) represents that the current logged-in user is "User A".

In the menu 600 in the portal window (FIG. 6(1)), when the user presses the copy button 601, the display of the touch panel 300 is switched to a copy setting window, for example.

6. Copy Setting Window

FIG. 7(1) illustrates one example of a copy setting window 700. Setting values of various setting items are displayed on the copy setting window 700 as setting information related to a copy function. In the example of FIG. 7(1), the copy setting window 700 is formed of a region 701 that indicates setting values of various setting items such as color selection, magnification, sheet size, and the number of copies and various buttons that indicate setting values of other setting items in rows or the like.

A preview button 702 is a button displaying image data output by using current setting values as a preview. When the preview button 702 is pressed, a window presenting current setting values in detail is displayed. Further, a button used for setting a basic setting item of a copy function may be a color selection button 703, a magnification setting button 704, a sheet selection button 705, a finish button 706, a duplex printing button 707, a density button 708, a document type button 709, and an ID card copy button 710. An "Other functions" button 711 is used for setting other setting items of a copy function.

A setting history button 712 is a button used for displaying the history of setting values used in the past in a copy function. A frequently used setting button 713 is a button used for displaying a window of registration, edition, and calling of a frequently used setting value. A home button 714 is a button used for returning to the portal window (FIG. 6(1)). A gear wheel button 715 is a button used for displaying a setting item related to the overall app.

In the example of FIG. 7(1), from the region 701 that displays setting values, it is understood that the current setting values are monochrome for color, 100% for magnification, automatic for size of sheet, and one for the number of copies. Further, since the finish button 706 is displayed in the inverted manner, it is understood that sorting is set.

When the user places a document to be copied on a scanner in this state and presses the start key 301, the CPU 101 instructs the image processing unit 121 to perform copying with these setting values. Further, when the user presses the start key 301, in response to a start instruction, the CPU 101 causes the image processing unit 121 to read the document by using the scanner. After completion of the reading, the image processing unit 121 generates an output image. At this time, the image processing unit 121 reflects functions related to an image set in copying to the output image and outputs a copy of the input document.

7. Button Registration Process

Figure 8:
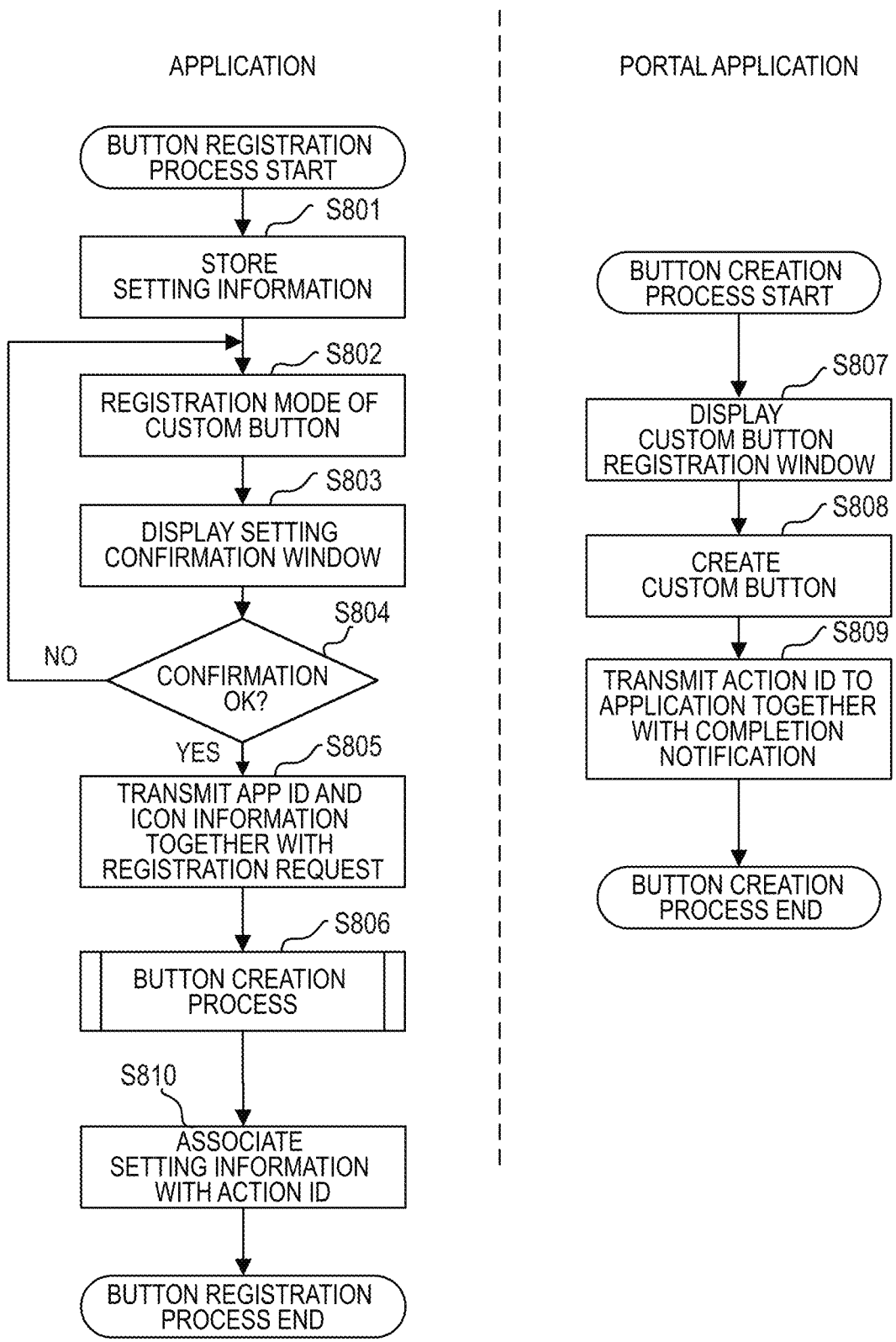
FIG. 8 is a flowchart illustrating a button registration process.

Next, a button registration process of registering a custom button will be described with reference to a flowchart of FIG. 8. Herein, an example in which a custom button is registered to the copy app 211 will be described. In FIG. 8, to distinguish a process performed by the copy app 211 and a process performed by the portal app 213 from each other, the process performed by the copy app 211 is illustrated on the left side, and the process performed by the portal app 213 is illustrated on the right side. Note that all the processes in the present embodiment are performed when the portal app 213 acquires information or the input by the user stored in the HDD 104 in advance and provides various execution instructions by using the CPU 101 based on the information. Further, all the processes performed by the copy app 211 or the portal app 213 are performed by the CPU 101.

Herein, as illustrated in FIG. 6(2), a case where copy settings specifying two for the number of copies, double-sided to double-sided, and sorting are registered in the menu 600 as a custom button 613 in the copy app 211 will be described as an example.

First, as illustrated in FIG. 7(2), if the user selects setting values of various setting items that are the number of copies, duplex printing, and sorting on the copy setting window 700, the copy app 211 determines these selling values and stores the setting values in the HDD 104 as setting information (S801).

Next, in response to detecting pressing of the gear wheel button 715 in the copy setting window 700, the copy app 211 displays a menu list 901 on the copy setting window 700 as illustrated in FIG. 9A(1). Then, in response to detecting pressing of the registration button 902 in the menu list 901, the copy app 211 enters a registration mode in which a custom button is registered to the portal window (S802).

Once entering the registration mode, the copy app 211 displays a setting confirmation window 903 as a popup on the copy setting window 700 as illustrated in FIG. 9A(2) (S803). On the setting confirmation window 903, setting values (two, double-sided to double-sided, or the like) for setting items (the number of copies, duplex setting, or the like) set by the user, a cancel button 904, and a next button 905 are displayed.

In response to detecting pressing of the next button 905 in the setting confirmation window (FIG. 9A(2)) (S804, YES), the copy app 211 transmits a registration request to the portal app 213 (S805). In a registration request, the copy app 211 acquires its own app ID (1000) and icon information displayed as a custom button from the HDD 104 and transmits the app ID and the icon information to the portal app 213. Note that information related to setting values such as the number of copies is not transmitted.

As a specific process of S805, the copy app 211 acquires the app ID and the icon information from a storage region (including common data unit 220 and the copy data unit 221) of the copy app 211 set in the HDD 104. The copy app 211 then notifies the window control unit 201 of the information. Further, the window control unit 201 transmits the information to the portal app 213. The portal app 213 stores the received information in a storage region (including the common data unit 220 and the portal data unit 223) of the portal app 213.

When a registration request is transmitted from the copy app 211 to the portal app 213, a button creation process is performed by a portal app (S806). When the button creation process starts, the portal app 213 first displays a custom button registration window (S807).

FIG. 9B(3) illustrates an example of a custom button registration window 906 displayed as a popup on the copy setting window 700. A soft button used for selecting/inputting a button display position is displayed on the custom button registration window 906 of FIG. 9B(3). In response to detecting pressing of a next button 907 in the custom button registration window 906, the portal app 213 changes the window from the custom button registration window 906 to a custom button display setting window 908.

FIG. 9B(4) illustrates an example of the custom button display setting window 908 to be displayed as a popup on the copy setting window 700. An input box used for inputting a button name and an input box used for inputting a comment displayed on the custom button display setting window 908. Further, in response to detecting pressing of an OK button 909, which means completion of the input, in the custom button display setting window 908, the portal app 213 creates a custom button based on the content input in the custom button display setting window 908 (S808).

In a process of creating a custom button, the portal app 213 first generates an action ID that can uniquely identify every registration request (in the present embodiment, consecutive numbers from "1" are provided as an action ID). Next, the portal app 213 creates a custom button based on the app ID, the action ID, the icon information, and the display information.

Specifically, in a storage region of the portal app 213 in the HDD 104, an app ID of the copy app 211, an action ID, icon information, and display information are associated with each other and stored in the custom button as a button information table (FIG. 10). It is indicated that custom button No. 4 is added to the button information table illustrated in FIG. 10 due to this registration process.

In response to completion of the custom button creation, the portal app 213 transmits a completion notification and the generated action ID to the copy app 211 (S809). The button creation process by the portal app then ends.

In response to end of the button creation process performed by the portal app 213, the copy app 211 stores the received action ID in a storage region of the copy app 211 in the HDD 104 in association with the setting information stored in S801 (S810). The registration mode in which a custom button is registered in the portal window then ends.

8. Action Information Table

FIG. 11 illustrates one example of an action information table stored in the storage region of the copy app 211 in the HDD 104, In the action information table illustrated in FIG. 11, for each action ID, the icon information and setting information are associated and stored as action information. Note that when the copy app 211 always uses the same icon, it is not required that the action ID and the icon information are stored in association with each other as illustrated in FIG. 11.

When the button registration process of FIG. 8 as described above is performed, button setting information registered in the portal window is stored only in the copy app 211, and the portal app 213 stores only an action ID. Note that, when the setting information stored in the copy app 211 is performed by using the portal app 213, it is only required to notify the copy app 211 of an execution instruction of the action ID. As described above, even when the portal app 213 manages setting information in any data format, registration to the portal window can be performed in the same procedure.

Although the process performed by the copy app 211 has been described as an example of an app in the present embodiment, the same process can be performed in the fax app 212 and other apps.

9. Execution Process

Next, a process of calling a custom button displayed on the menu 600 and performing an app will be described with reference to a flowchart of FIG. 12.

In the present embodiment, an example in which the custom button 613 is pressed in the menu 600 illustrated in FIG. 6(2) will be described. In FIG. 12, the button calling process performed by the portal app 213 is illustrated on the left side, and the action ID process performed by the copy app 211 is illustrated on the right side.

In response to detecting pressing of the custom button 613 on the menu 600, the portal app 213 searches a button information table (FIG. 10) for a custom button No. corresponding to the pressed custom button (S1201).

Next, the portal app 213 acquires an app ID and an action ID corresponding to the custom button No. from the button information table and notifies an app corresponding to the app ID of the action ID (S1202). Herein, an element "1000" as an app ID and an element "2" as an action ID are acquired from the custom button No. 4 corresponding to the custom button 613 in the button information table (FIG. 10), and the acquired action ID is notified to the copy app 211.

When the action ID is notified to the copy app 211, the action ID process is performed (S1203). The copy app 211 that has received the action ID acquires setting information corresponding to the received action ID out of the action information (FIG. 11) (S1204). Next, the copy app 211 displays a setting content confirmation window according to the app on the touch panel 300 as a popup (S1205).

FIG. 9C(5) illustrates an example of a setting content confirmation window 910 to be displayed as a popup on the copy setting window 700. A setting value that is unique to the app included in the acquired action information is displayed on the setting content confirmation window 910.

Next, in response to detecting pressing of an OK button 911 displayed on the setting content confirmation window 910 (S1206, YES), the copy app 211 displays a copy setting window to which setting information corresponding to the received action ID has been reflected (S1207). FIG. 7(2) illustrates an example of a copy setting window to which setting information has been reflected. The user may provide an execution instruction without change from the setting information associated with the custom button 613 in the copy setting window of FIG. 7(2) and may also provide an execution instruction after changing any of the setting values.

Next, the copy app 211 waits for the user to press the start key 301 of the operation unit 112 (S1208) and then performs a process (S1209). The process in this case is performed based on setting information set in the copy setting window (FIG. 7(2)) displayed in S1207. Next, the copy app 211 compares setting information in execution with setting information acquired in S1204 and determines whether or not the setting information has been changed (S1210). Further, if the setting information has been changed, a setting value that is a difference is stored in a setting information difference table illustrated in FIG. 13 (S1211). The action ID process then ends.

As a specific process of S1210, a case where the start key 301 of the operation unit 112 is pressed and the process of S1209 is performed after the user sets monochrome and single-sided in the copy setting window (FIG. 7(2)) displayed in S1207 will be described. In such a case, the copy app 211 compares setting information in execution with setting information corresponding to the received action ID ("2") in the action information table (FIG. 11).

As a result, setting information forming a difference (a setting information difference) corresponds to monochrome and single-sided. Accordingly, the copy app 211 stores a setting information difference for each custom button related to the app in a setting information difference table (FIG. 13) in a storage region of the copy app 211 in the HDD 104. The number of times of setting is counted up by one each time the number of times of setting is extracted as a setting information difference in S1210. FIG. 13(1) illustrates that the number of times of setting is "1" for respective setting values of monochrome and single-sided corresponding to the action ID "2".

10. Button Setting Change Process

Next, a process of providing a setting change instruction to a custom button displayed on the menu 600 and then performing an app will be described with reference to a flowchart of FIG. 14. If the user changed some of settings associated with a custom button that is a display object and then performed a process in the past, history information that is the changed setting value is stored for each display object. Further, a setting that has been changed many times is displayed as a recommendation for the user based on the stored history information. If the number of times that the user has changed a setting associated with a custom button and performed the process is greater than the predetermined number of times, that is, if the number of records stored in the setting information difference table (FIG. 13) excesses a predetermined value, a process illustrated in FIG. 14 may be performed.

Herein, an example in which a setting change instruction is provided to the custom button 604 in the menu 600 illustrated in FIG. 6(1) will be described. In FIG. 14, the button setting change process performed by the portal app 213 is illustrated on the left side, and the action ID process performed by the called copy app 211 is illustrated on the right side.

In response to detecting a setting change instruction of the custom button 604 on the portal window (FIG. 6(1)), the portal app 213 searches the button information table (FIG. 10) for a custom button No. corresponding to a custom button designated by the setting change instruction (S1401). The instruction in this case may be any instruction that can be distinguished from an instruction for starting the button calling process illustrated in FIG. 12 (S1201). The button calling process of S1201 is started by a press operation in the present embodiment, the setting change instruction may be any other operations. For example, a long press operation or two or more consecutive presses operations may be employed, a button response region used for starting the button calling process and a button response region used for providing a setting change instruction may be separated, or the like.

Next, the portal app 213 acquires an app ID and an action ID corresponding to a custom button No. from the button information table (FIG. 10) and notifies an app corresponding to the app ID of the action ID (S1402). Herein, the element "1000" as an app ID and the element "1" as an action ID are acquired from custom button No. 1 corresponding to the custom button 604 in the button information table (FIG. 10), and the acquired action ID is notified to the copy app 211.

Once the action ID is notified to the copy app 211, the action ID process is performed (S1403). Note that the content of the action ID process in S1403 is different from the content of the action ID process in S1203 as described later.

First, the copy app 211 that has received the action ID acquires a setting information difference corresponding to the received action ID out of the setting information difference table (FIG. 13) (S1404).

Next, the copy app 211 displays a list of setting change choices to the custom button 604 on the touch panel 300 as a popup based on the acquired setting information difference (S1405).

FIG. 15A(1) illustrates an example of a list of setting change choices 1500 for the custom button 604. Setting change candidate buttons 1501 and 1502 and an "Other settings" button 1503 are displayed on the list of setting change choices 1500 as a setting button. Herein, the setting buttons 1501, 1502, and 1503 are displayed on a portal window on which a custom button is displayed. That is, although a case where a window is not changed when a setting change instruction of a custom button is detected, and a setting button is displayed on the same window as the custom button is described as an example, the embodiment is not limited thereto. A window may be changed when a setting change instruction of a custom button is detected, and the setting buttons 1501, 1502, and 1503 may be displayed.

Setting change candidate buttons 1501 and 1502 are buttons used for preferentially displaying a setting value in descending order of the number of times of setting out of the setting information difference table (FIG. 13). Further, the "Other settings" button 1503 is a setting button used for access to all the setting items available from the app. In the example of FIG. 15A(1), based on the setting information difference table of FIG. 13(1), the number of times of setting for staple top-right being "7" and the number of times of setting for double-sided being "5" are displayed as the setting change candidate buttons 1501 and 1502.

Note that the maximum number of setting change choice buttons that can be displayed in the menu 600 region of the touch panel 300 is two in the example of FIG. 15A(1) but can be changed in accordance with the layout or the like of the menu 600 and is not limited to a specific value.

Further, when there is no setting information difference corresponding to the received action ID in the setting information difference table (FIG. 13), no setting change choice button is displayed, and only the "Other settings" button 1503 used for access to all the setting items available from the app is displayed. Alternatively, in addition to the "Other settings" button 1503, one or a plurality of setting values that are frequently set in the app in general may be displayed as an initial value of the setting change candidate button.

Next, the copy app 211 determines whether or not any of setting change candidate buttons displayed on the list of setting change choices 1500 is pressed (S1406).

For example, in response to detecting pressing of a staple top-right button 1501 that is a setting change candidate button (S1406, YES), the copy app 211 inverts the color of the staple top-right button 1501 (FIG. 15A(2)). In addition, a setting of staple top-right is stored in the HDD 104 in association with setting information corresponding to an action ID "1" in the action information table (FIG. 11) (S1407).

On the other hand, in response to detecting pressing of a button other than the setting change candidate buttons (S1406, NO), the copy app 211 determines whether or not the pressed button is the "Other settings" button 1503 (S1408).

If the pressed button is the "Other settings" button 1503, the copy app 211 displays the setting information corresponding to the received action ID on the setting change window that enables access to all the setting items that can be set in the copy app 211 (S1409). Further, if any of the setting change candidate buttons 1501 and 1502 is pressed before the "Other settings" button 1503 is pressed, the setting values are reflected, and the reflected setting values are displayed.

FIG. 15B(4) illustrates an example of a setting change window 1504 that is displayed in response to pressing of the "Other settings" button 1503 and enables access to all the setting items available with the copy app 211. The user may change any of setting values in the setting change window 1504. The content displayed on the setting change window 1504 of FIG. 15B(4) may be the same as the copy selling window 700 illustrated in FIG. 7(1). Further, for simpler operation, a setting change window that is different from the copy setting window 700 may be provided, for example, setting items may be displayed in a list form, or the like. Note that a back button 1505 not present in the copy setting window 700 of FIG. 7(1) is displayed on the setting change window 1504 that enables access to all the setting items available with the copy app 211.

Next, the copy app 211 determines whether or not a back button displayed on the setting change window 1504 (FIG. 15B(4)) is pressed (S1410).

In response to detecting pressing of the back button 1505 (S1410, YES), the copy app 211 stores, in the HDD 104, a setting value changed in the setting change window 1504 in association with selling information corresponding to the action ID "1" in the action information table (FIG. 11). Further, as illustrated in FIG. 15B(3), the "Other settings" button 1503 is displayed in the inverted color (S1411).

On the other hand, in response to detecting pressing of a region other than the list of setting change choices 1500 (FIG. 15A(1)) in S1406 (S1406, NO, and S1408, NO), the copy app 211 ends the action ID process.

Note that, in the setting change candidate buttons 1501 and 1502 (FIG. 15A(1)), a button related to a setting value that is unable to be combined with the previously set setting value is made non-selectable. Similarly, in the setting change window 1504 (FIG. 15B(4)), a button related to a setting value that is unable to be combined with the previously set setting value is also made non-selectable. For example, the color of the button is changed to gray different from the inverted color indicating a pressed state or is changed to a shaded pattern indicating an inoperable state.

Note that, when there is a setting value that is unable to be combined with the previously set contents, it is not necessarily required to prioritize the previously set setting value. For example, a setting value set later may be prioritized, and then a previously set setting value may be automatically changed to a setting value that can be combined with the setting value set later.

Next, if the start key 301 of the operation unit 112 is pressed by the user (S1412, YES), the copy app 211 performs a process (S1413), The process in this case is performed based on the setting information stored in the HDD 104 in S1407 or S1411. Herein, a scheme of notifying the user of setting values that are unable to be combined with each other is not limited to a scheme of changing a button to a non-selectable button at a timing of setting the combination to be disabled. For example, a message such as "settings unable to be combined have been automatically changed" may be displayed at a timing of S1412. In the latter case, in S1413, the copy app 211 performs the process after changing setting information stored in the HDD 104 in S1407 or S1411 to the automatically corrected setting information.

The copy app 211 then compares setting information in execution with setting information corresponding to the action ID of the action information table (FIG. 11) acquired in S1402 and determines whether or not the setting information has been changed (S1414).

If the setting information has not been changed (S1414, NO), the copy app 211 directly ends the action ID process.

On the other hand, if the setting information has been changed, the copy app 211 stores a setting information difference, which is a setting value to be a difference, in the setting information difference table (FIG. 13) (S1415). The action ID process then ends.

As a specific process of S1415, a case where a staple top-right setting and a color setting are made in S1407 or S1411 will be described, for example. In such a case, the copy app 211 extracts a staple top-right selling and a color setting as a setting information difference in S1414 and counts up the number of times of setting for staple top-right from 7 to 8 in the setting information difference table (FIG. 13(2)). Further, a color setting is newly stored as a setting information difference.

As described above, according to the first embodiment, when setting information on a custom button to which specific setting information is provided is changed, a selling information difference is stored for each custom button. Accordingly, since fine differences in setting values for each purpose of use can be presented to the user as a setting change candidate button on a custom button basis, this makes it possible to select a desired setting value in a short procedure. Further, it is also possible to display a change candidate button when changing the setting of a custom button and to switch the window to display a setting change window that enables access to all the setting items when changing the setting of an app button.

Second Embodiment

In the first embodiment, in the action ID process (FIG. 12), the copy setting window 700 (FIG. 7(2)) to which setting information is reflected is displayed (S1207), and in response to the start key 301 of the operation unit 112 being pressed (S1208), the process is performed (S1209).

In contrast, in the second embodiment, on the setting content confirmation window 910 (FIG. 9C(5)) displayed as a popup in the copy setting window 700, in response to the OK button 911 being pressed by the user (S1206, YES), the process is performed. That is, in the second embodiment, in the flowchart of FIG. 12 described in the first embodiment, the process of S1207 to S1208 is skipped, and the process of S1209 is started immediately after S1206.

Also in the second embodiment, in the flowchart of the button setting change process (FIG. 14), the setting change window 1504 (FIG. 15B(4)) that enables access to all the setting items available with the copy app 211 is displayed. Then, on the setting change window 1504, the setting item registered to a custom button can be changed (S1409). Further, a setting information difference can be stored on a custom button basis (S1415).

As described above, also in the second embodiment, since fine differences in setting values for each purpose of use can be presented. to the user as a setting change candidate button on a custom button basis, this makes it possible to select a desired setting value in a short procedure.

Third Embodiment

The first embodiment is configured to display setting values such as staple top-right, double-sided, or the like, for example, as the setting change candidate buttons 1501 and 1502 in the list of setting change choices 1500 (FIG. 15A(1)).

In contrast, the third embodiment is configured to display a setting item as the setting change candidate button.

Due to such a configuration, in the third embodiment, instead of a setting value, a setting item is stored as a setting information difference in the setting information difference table (FIG. 13). For example, as illustrated in the setting information difference table of FIG. 13(2), instead of each setting value such as double-sided, staple top-right, or color, each setting item such as duplex printing, finish, or color selection are stored for a setting information difference related to the action ID "1".

Figure 14:
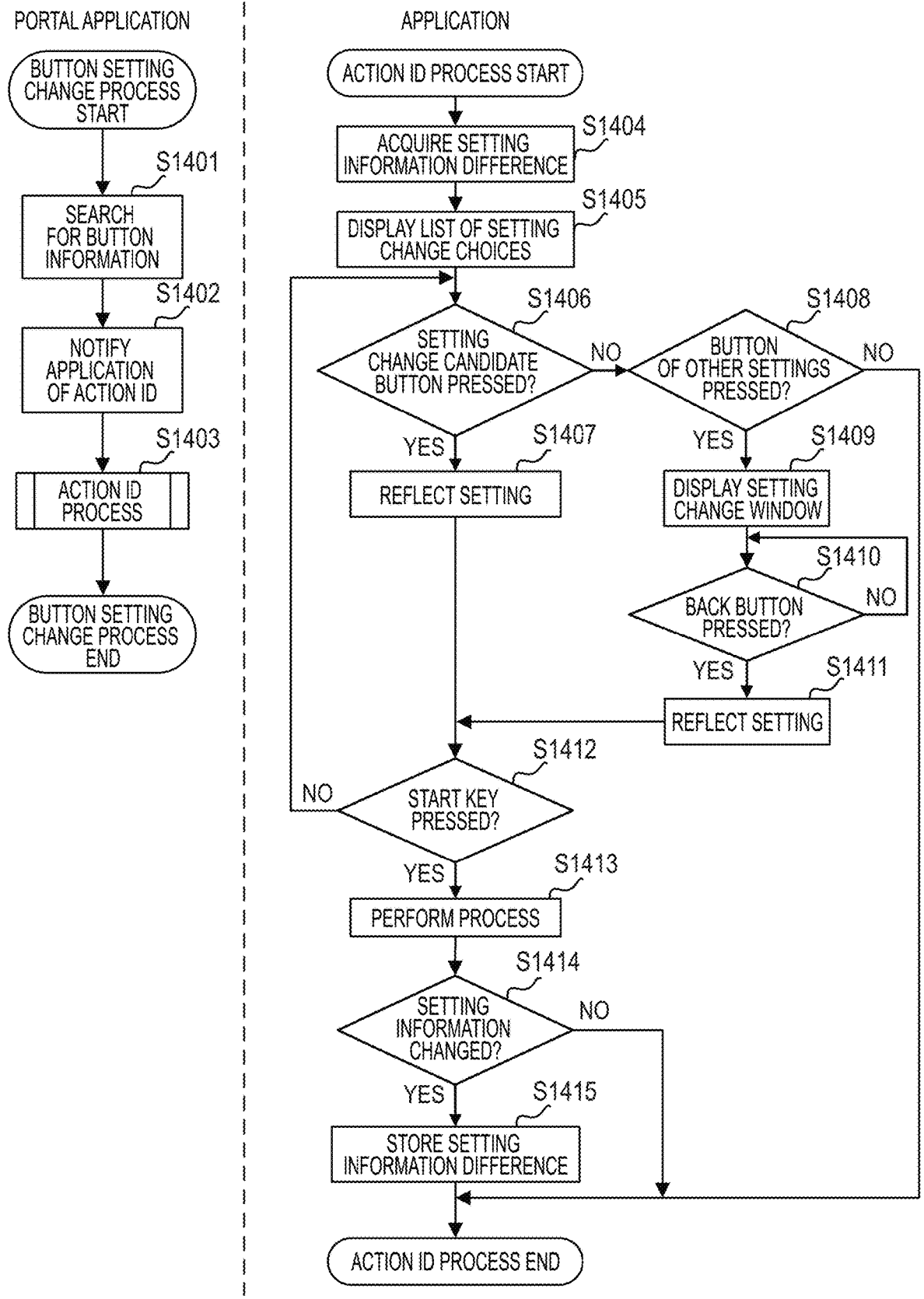
FIG. 14 is a flowchart illustrating a button setting change process.

Further, in S1405 of the flowchart of the button setting change process of FIG. 14, various setting items such as finish, duplex setting, and color selection are displayed as the selling change candidate buttons 1501 and 1502 in the list of setting change choices 1500 (FIG. 15A(1)), Then, in response to detection of pressing of any of the setting items displayed as the setting change candidate buttons 1501 and 1502, a setting change window related to the pressed setting item is displayed, and in response to detection of pressing of either the setting value button or the OK button on the setting change window, the process returns to S1406.

Figure 15C:
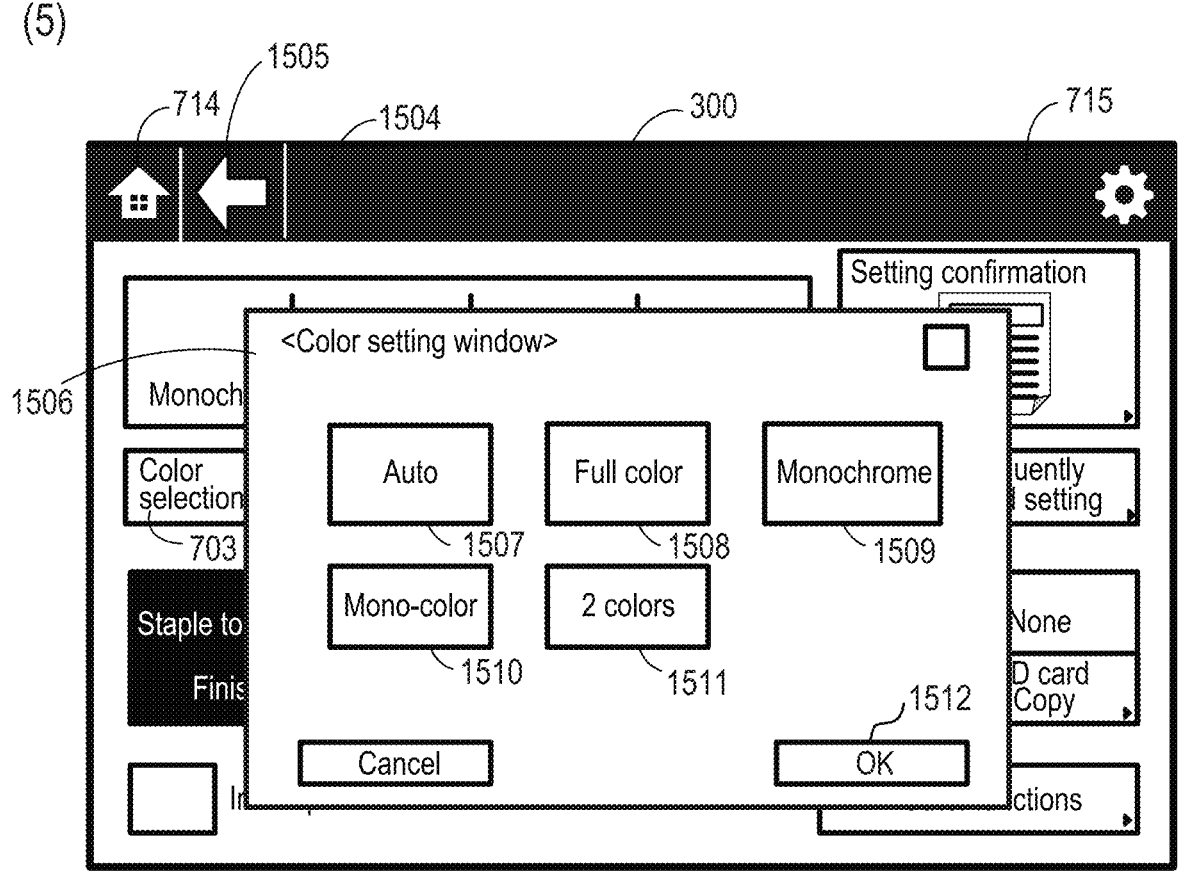
FIG. 15C illustrates an example of a color setting window.

For example, when a setting item of color selection is displayed as a setting change candidate button, in response to detection of pressing of the button, a color setting window 1506 related to the setting item of color selection as illustrated in FIG. 15C(5) is displayed. Then, on the color setting window 1506, any of the setting value buttons 1507 to 1511 is selected, and in response to detection of pressing of the OK button 1512, the process returns to S1406.

Note that the color setting window 1506 illustrated in FIG. 15C(5) may have the same configuration as the selection window displayed when the color selection button 703 is selected on the copy setting window 700 (FIG. 7(1)). Further, for simpler operation, a window in which various setting values are displayed in a list form may be employed, for example.

In such a way, according to the third embodiment, setting items are displayed as setting change candidate buttons displayed on a custom button basis, and when any of the setting items is selected, a setting change window used for selecting a setting value related to the setting item is displayed.

Accordingly, even when the maximum number of buttons that can be displayed as setting change candidate buttons is limited, differences of more setting values can be supported.

Fourth Embodiment

The first embodiment is configured to preferentially display setting values as setting change candidate buttons displayed as the list of setting change choices 1500 (FIG. 15A(1)) in descending order of the number of times of setting out of setting values stored as setting information differences of the setting information difference table (FIG. 13).

However, it is preferable to display all the time some of the setting values to be displayed in setting change candidate buttons, which are, for example, a setting value related to billing such as the number of copies or duplex setting in a case of copy or a setting value related to a destination address in a case of fax, regardless of the number of times of setting. Accordingly, the fourth embodiment is configured to always display a setting value or a setting item to be displayed all the time as a setting change candidate button.

Due to such a configuration, in the fourth embodiment, information such as "display always/not" is also stored in addition to an action ID and a setting information difference in the setting information difference table (FIG. 13). Further, setting values stored as "display always" in the setting information difference table are displayed all the time as the setting change candidate buttons 1501 and 1502 in the list of setting change choices 1500 (FIG. 15A(1)) regardless of the number of times of setting for other setting values.

As described above, according to the fourth embodiment, a particular setting value or setting item is displayed all the time as the setting change candidate button regardless of the number of times of setting, and this makes it possible to select a desired setting value with a short procedure.

Fifth Embodiment

The first embodiment is configured to display setting values as the setting change candidate buttons 1501 and 1502 displayed in the list of setting change choices 1500 (FIG. 15A(1)).

In contrast, the fifth embodiment is configured to display a combination of setting values as a setting change candidate button.

Due to such a configuration, in the fifth embodiment, as illustrated in FIG. 13(3), a combination of setting values and the number of times of setting are stored in association with each other as a setting information difference in the setting information difference table. For example, in the setting information difference table in FIG. 13(3), a combination of changed setting values, such as "Double-sided, Staple top-right" or "Color, 2 in 1" is collectively stored in the setting information difference related to the action ID "1".

Further, in S1404 of the flowchart of the button setting change process of FIG. 14, a configuration of setting values, such as "Double-sided, Staple top-right" or "Color, 2 in 1" is displayed as the setting change candidate buttons 1501 and 1502. Note that selection of the setting change candidate buttons 1501 and 1502 in which a combination of setting values is displayed is exclusive, and a plurality of setting change candidate buttons are unable to be selected at the same time. Accordingly, when there is a previously set setting change candidate button, all the setting change candidate buttons except for the "Other settings" button 1503 are unable to be pressed (selected). For example, the color of these buttons is changed to gray different from the inverted color indicating a pressed state or is changed to a shaded pattern indicating an inoperable state.

As described above, according to the fifth embodiment, since a combination of setting values is displayed as a setting change choice button, this makes it possible to select a desired setting value with a shorter procedure.

Sixth Embodiment

In the first embodiment, eligible buttons for the button setting change process illustrated in FIG. 14 are configured as the custom buttons 604 to 606 of the menu 600 (FIG. 6(1)).

In contrast, in the sixth embodiment, eligible buttons for the button setting change process are configured as the app buttons 601 to 603.

Figure 12:
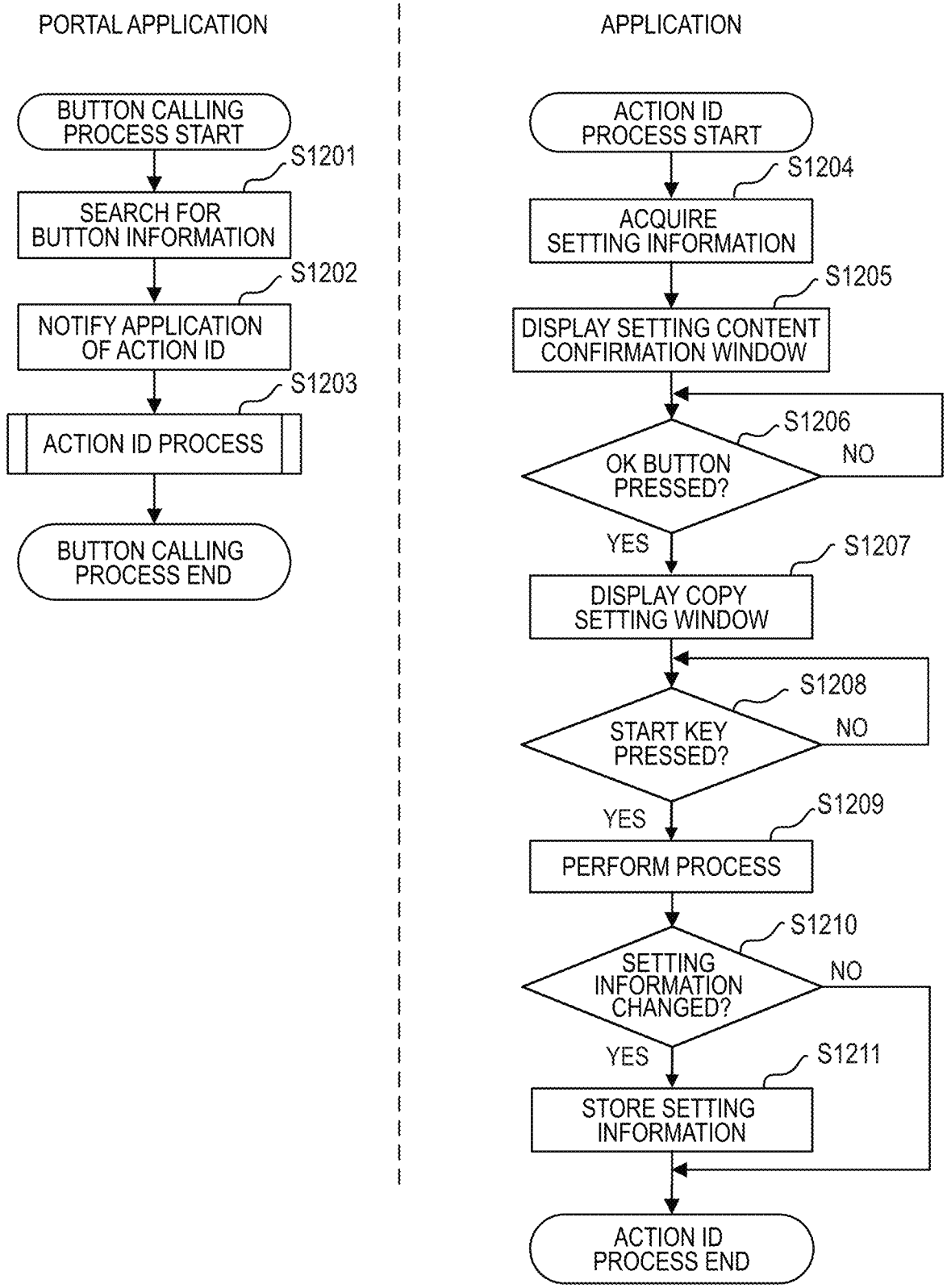
FIG. 12 is a flowchart illustrating a button calling process.
Figure 16:
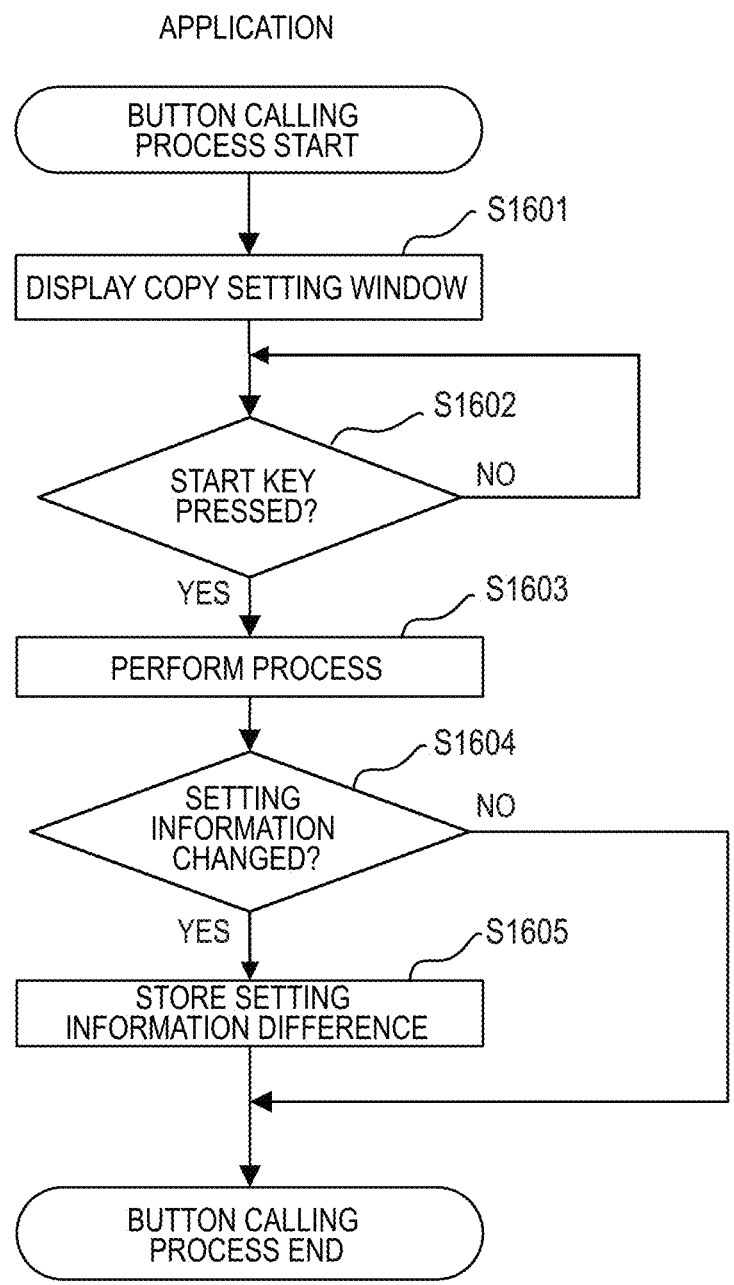
FIG. 16 is another flowchart illustrating a button calling process.

Due to such a configuration, in the sixth embodiment, the button calling process illustrated in the flowchart of FIG. 12 is changed in the same manner as in the flowchart of FIG. 16.

The flowchart of FIG. 16 will be described assuming that the copy button 601 is pressed as an app button in the menu 600 (FIG. 6(1)).

In response to detecting pressing of the copy button 601 on the menu 600, the copy app 211 acquires a setting value or the like from the HDD 104 and displays the copy setting window 700 (FIG. 7(1)) (S1601). In the copy setting window 700, the user selects a setting value by using a button provided for setting various copy functions.

In response to the start key of the operation unit 112 being pressed (S1602), the copy app 211 performs a process (S1603). The process in this case is performed based on setting information set on the window displayed in S1601.

Next, the copy app 211 compares setting information in performing the process with the setting information acquired in S1601 and determines whether or not the setting information has been changed (S1604).

If the setting information has been changed (S1604, YES), a setting information difference, which is a setting value to be a difference, is stored in a storage region of the copy app 211 inside the HDD 104, in which a setting value and the number of times of setting are associated with each other, as illustrated in the setting information difference table of FIG. 13(4) (S1605). Note that the number of times of setting is counted up by one every time it is extracted as the setting information difference in S1604. The process then ends the button calling process.

On the other hand, if the setting information has not been changed (S1604, NO), the process directly ends the button calling process.

Further, when the button setting change process is performed on the app buttons 601 to 603, in the flowchart of FIG. 14 illustrated in the first embodiment, the start block and the end block are on the application side, and the process of S1401 and S1402 is omitted.

As described above, according to the sixth embodiment, a setting information difference is stored when setting information has been changed also for an app button used for executing an app with a default setting value. Although app buttons are used for more versatile purposes than custom buttons, since a large amount of setting difference information is collected, fine differences in setting values for each actual purpose of use can be presented to the user.

Seventh Embodiment

The first embodiment is configured to display setting values in the setting change candidate buttons 1501 and 1502 in the list of setting change choices 1500 (FIG. 15A(1)) up to the maximum display number thereof in descending order of the number of times of setting out of setting values included in setting information differences of the setting information difference table (FIG. 13).

In contrast, the seventh embodiment is configured to, every time a selling change candidate button is selected, update the setting change candidate button to a setting value highly related with the selected setting value.

Due to such a configuration, in the seventh embodiment, in addition to a setting information difference, a setting value set at the same time as a selected selling candidate button is stored as related setting information in the same manner as for the selling information difference table illustrated in FIG. 13(5). For example, it is assumed that a setting information difference such as double-sided, staple top-right, and 2 in 1 is extracted in S1210 of the button calling process illustrated in FIG. 12. In this case, respective numbers of times of setting are counted up by one for double-sided, staple top-right, and 2 in 1 and stored as setting values of the setting information difference, as illustrated in FIG. 13(5). Furthermore, for each setting value, the setting value extracted at the same time is defined as a setting value of related setting information, and the number of times of setting thereof is counted up by one and stored. For example, when the setting value is double-sided, since staple top-right and 2 in 1 are set at the same time as double-sided, staple top-right and 2 in 1 are stored in the table information as setting values of the related setting information, and respective numbers of times of setting are counted up by "1".

Figure 17:
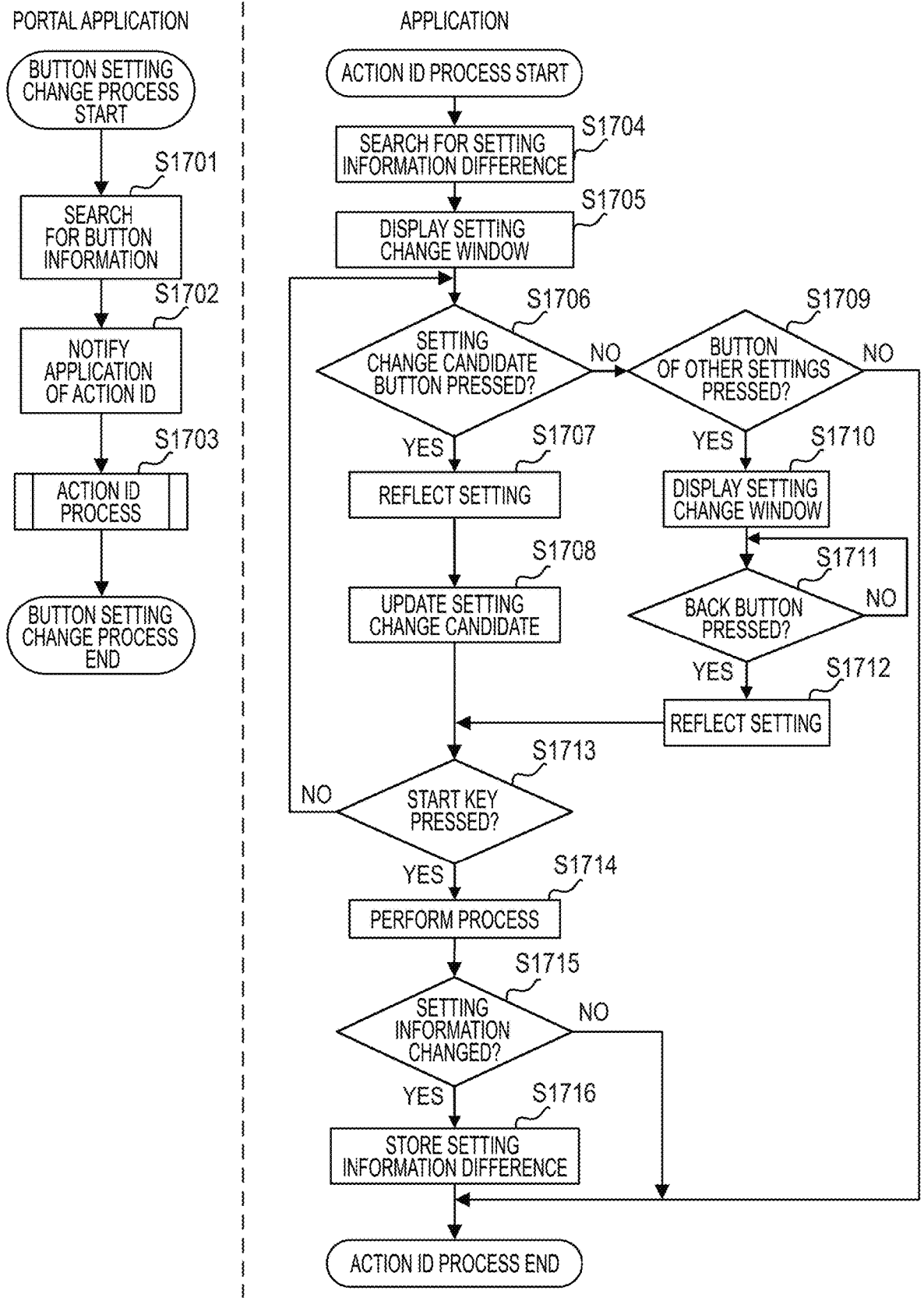
FIG. 17 is another flowchart illustrating a button setting change process.

Further, the flowchart representing the button setting change process will be a flowchart as illustrated in FIG. 17 instead of FIG. 14 described in the first embodiment. In the flowchart of FIG. 17, the process from S1701 to S1707 is the same as the process from S1401 to S1407 of the flowchart of FIG. 14. Further, the process from S1709 to S1716 is the same as the process from S1401 to S1407 of the flowchart of FIG. 14. However, the flowchart of FIG. 17 differs from the flowchart of FIG. 14 in that a step of S1708 is added.

In the flowchart of FIG. 17, the copy app 211 acquires related setting information on a setting value pressed in S1406 from the setting information difference table illustrated in FIG. 13(5) subsequent to the process of S1406. The app then extracts the setting values up to the maximum number in descending order of related degree (the number of times of setting) out of the acquired related setting information and updates and displays the setting change candidate buttons 1501 and 1502 (S1708). For example, if duplex printing is selected as a setting change candidate button in S1406, the app searches the setting information difference table (FIG. 13(5)) and updates and displays setting values up to the maximum number in descending order of related degree (monochrome and three copies in this example) as the setting change candidate buttons.

As described above, according to the seventh embodiment, related setting information related to a selected setting value is collected, and based on this, a setting change candidate button is updated and displayed. Accordingly, it is possible to select a setting value highly related to the selected setting value in a shorter procedure.

Eighth Embodiment

The first embodiment is configured such that the selling information difference table that records setting information differences (FIG. 13) is stored in a storage region of each app in the HDD 104 of the image processing apparatus 1.

In contrast, the eighth embodiment is configured such that the setting information difference table is stored in the server 2 that is an external device connected by the network 3 via the LAN 113, the WAN 114, the wireless network 115, or the like instead of in the image processing apparatus 1.

Due to such a configuration, in the eighth embodiment, the CPU 101 acquires a setting information difference stored in the server 2 via the network 3 based on an instruction of the copy app 211 and notifies the copy app 211.

Note that it is considered that there may be a case where a failure occurs in the connection to the server 2 and the stored setting information difference can no longer be acquired from the server 2. In such a case, setting values are displayed in the setting change candidate buttons 1501 and 1502 in the list of setting change choices 1500 (FIG. 15A(1)) up to the maximum number of the setting values in descending order of the number of times of use out of the setting values for the copy app 211.

As described above, according to the eighth embodiment, a setting information difference table is stored in the server 2 that is an external device connected to the image processing apparatus 1. Further, when a failure occurs in the connection to the server 2, setting values are displayed based on the number of times of use regardless of the selling information difference as the setting change candidate buttons 1501 and 1502.

Other Embodiments

Further, the embodiments according to the present disclosure may be applied to a system formed of a plurality of devices or may be applied to an apparatus formed of a single device.

Embodiments of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiments and/or that includes one or more circuits (e.g., application specific integrated circuit (ASIC)) for performing the functions of one or more of the above-described embodiments, and by a method performed by the computer of the system or apparatus by, for example, reading out and executing the computer executable instructions from the storage medium to perform the functions of one or more of the above-described embodiments and/or controlling the one or more circuits to perform the functions of one or more of the above-described embodiments. The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While the present disclosure has been described with reference to exemplary embodiments, it is to be understood that the disclosure is not limited to the described exemplary embodiments. The scope of the following claims is to be accorded the broadest interpretation so as to encompass all such modifications and equivalent structures and functions.

This application claims the benefit of Japanese Patent Application No. 2020-116487, filed Jul. 6, 2020, which is hereby incorporated by reference herein in its entirety.

What is claimed is:

1. An image processing apparatus comprising:
one or more processors and at least one memory coupled to the one or more processors and having instructions stored thereon, wherein when the instructions are executed by the one or more processors, the at least one memory and the one or more processors acting as:
a display unit that displays a plurality of display objects used for accepting an execution instruction of a process performed by a predetermined function and associated with setting values different from each other, respectively;
a processing unit that, when execution of the process is instructed by an operation of any one of the plurality of display objects, executes the process in accordance with a setting value associated with the operated display object; and
a storage unit that, when some of the setting values associated with the display object in instruction for the process execution are changed and the process is executed based on the changed setting value, stores information indicating the changed setting value as history information for the display object,
wherein when the display object is operated, the display unit displays a setting value indicated by the history information stored in the storage unit as a change candidate of a setting value associated with the operated display object.

2. The image processing apparatus according to claim 1, wherein a setting value indicated by history information stored in the storage unit is formed of a setting value of one or a plurality of setting items.

3. The image processing apparatus according to claim 1, wherein when any one of the plurality of display objects is operated, the display unit displays a setting value indicated by the history information stored in the storage unit on the same window as the plurality of display objects as a change candidate of a setting value associated with the operated display object.

4. The image processing apparatus according to claim 1, wherein the display unit displays a combination of selling values related to a plurality of setting items as the change candidate.

5. The image processing apparatus according to claim 1, wherein based on the history information, the display unit further displays a setting item as the change candidate.

6. The image processing apparatus according to claim 1, wherein based on history information stored in the storage unit, the display unit preferentially displays, as the change candidate, a setting value changed for a large number of times.

7. The image processing apparatus according to claim 1, wherein when a setting value displayed as the change candidate is selected, the selected setting value is reflected to the operated display object.

8. The image processing apparatus according to claim 1, wherein an operation of executing a process of the display object and an operation of displaying a change candidate of a selling value associated with a display object are different from each other.

9. The image processing apparatus according to claim 1, wherein the history information is set on a user basis.

10. A method for controlling an image processing apparatus including one or more processors and at least one memory coupled to the one or more processors, the method comprising:
displaying a plurality of display objects used for accepting an execution instruction of a process performed by a predetermined function and associated with setting values different from each other, respectively;
executing, when execution of the process is instructed by an operation of any one of the plurality of display objects, the process in accordance with a setting value associated with the operated display object;
storing, when some of the setting values associated with the display object in instruction for the process execution are changed and the process is executed based on the changed setting value, information indicating the changed setting value as history information for the display object; and
displaying, when the display object is operated, a setting value indicated by the history information stored in the storing as a change candidate of a setting value associated with the operated display object.

11. A non-transitory storage medium storing a program including instructions, which when executed by one or more processors of an image processing apparatus, cause the image processing apparatus to perform operations comprising:

displaying a plurality of display objects used for accepting an execution instruction of a process performed by a predetermined function and associated with setting values different from each other, respectively;

executing, when execution of the process is instructed by an operation of any one of the plurality of display objects, the process in accordance with a setting value associated with the operated display object;

storing, when some of the setting values associated with the display object in instruction for the process execution are changed and the process is executed based on the changed setting value, information indicating the changed setting value as history-information for the display object; and displaying, when the display object is operated, a setting value indicated by the history information stored in the storing as a change candidate of a setting value associated with the operated display object.

* * * * *